(12) United States Patent
Choi et al.

(10) Patent No.: US 11,570,449 B2
(45) Date of Patent: Jan. 31, 2023

(54) METHOD AND APPARATUS FOR VIDEO DECODING, AND METHOD AND APPARATUS FOR VIDEO ENCODING

(71) Applicant: SAMSUNG ELECTRONICS CO., LTD., Suwon-si (KR)

(72) Inventors: Na-rae Choi, Seoul (KR); Bo-ra Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/521,310

(22) Filed: Nov. 8, 2021

(65) Prior Publication Data

US 2022/0060721 A1 Feb. 24, 2022

Related U.S. Application Data

(63) Continuation of application No. 16/651,126, filed as application No. PCT/KR2018/012311 on Oct. 18, 2018, now Pat. No. 11,178,405.

(60) Provisional application No. 62/573,915, filed on Oct. 18, 2017.

(51) Int. Cl.
*H04N 19/159* (2014.01)
*H04N 19/103* (2014.01)
*H04N 19/176* (2014.01)

(52) U.S. Cl.
CPC ......... *H04N 19/159* (2014.11); *H04N 19/103* (2014.11); *H04N 19/176* (2014.11)

(58) Field of Classification Search
None
See application file for complete search history.

(56) References Cited

U.S. PATENT DOCUMENTS

2012/0327999 A1* 12/2012 Francois ............... H04N 19/13
2014/0086323 A1 3/2014 Chuang
2014/0219342 A1 8/2014 Yu et al.
(Continued)

FOREIGN PATENT DOCUMENTS

KR 101343373 B1 12/2013
KR 1020140008503 A 1/2014
(Continued)

OTHER PUBLICATIONS

Communication dated Dec. 22, 2021 issued by the Korean Intellectual Property Office in application No. 10-2020-7006642.
(Continued)

*Primary Examiner* — Christopher G Findley
(74) *Attorney, Agent, or Firm* — Sughrue Mion, PLLC

(57) ABSTRACT

Provided are a method and apparatus for performing intra prediction, in a video encoding and decoding procedure, by configuring an additional mode set based on most probable mode (MPM) modes of a current block, and determining an intra prediction mode of the current block, based on the MPM modes and the additional mode set. To solve the technical problems, a video decoding method provided in the present disclosure includes configuring an additional mode set based on MPM modes of a current block; determining an intra prediction mode of the current block, based on the MPM modes and the additional mode set; and performing intra prediction on the current block, based on the intra prediction mode.

1 Claim, 19 Drawing Sheets

(56) References Cited

U.S. PATENT DOCUMENTS

| | | | |
|---|---|---|---|
| 2014/0226912 A1 | 8/2014 | Lee et al. | |
| 2014/0247868 A1 | 9/2014 | Oh | |
| 2014/0301449 A1 | 10/2014 | Oh | |
| 2017/0244974 A1 | 8/2017 | Min et al. | |
| 2017/0272745 A1 | 9/2017 | Liu | |
| 2018/0302629 A1 | 10/2018 | Kondo | |
| 2018/0359471 A1 | 12/2018 | Lee et al. | |
| 2019/0116381 A1 | 4/2019 | Lee et al. | |
| 2019/0149836 A1* | 5/2019 | Moon | H04N 19/157 |
| 2019/0273919 A1 | 9/2019 | Lim | |
| 2019/0342548 A1 | 11/2019 | Oh et al. | |

FOREIGN PATENT DOCUMENTS

| | | |
|---|---|---|
| KR | 101490219 B1 | 2/2015 |
| KR | 1020170095792 A | 8/2017 |
| WO | 2016205693 A2 | 12/2016 |
| WO | 2016205702 A1 | 12/2016 |
| WO | 2017/176030 A1 | 10/2017 |

OTHER PUBLICATIONS

Communication dated Apr. 6, 2021 issued by the Intellectual Property India Patent Office in application No. 20207011977.

Communication dated Apr. 15, 2021 issued by the European Patent Office in application No. 18868846.9.

Tabatabai, A., et al., "Tool Experiment 6: Intra Prediction Improvement", Joint Collaborative Team on Video Coding (JCT-VC) of ITU-T SG16 WP3 and ISO/IEC JTC1/SC29/WG11, 2010, XP030233232, pp. 1-11.

International Search Report (PCT/ISA/210) dated Jan. 28, 2019 from the International Searching Authority in application No. PCT/KR2018/012311.

Written Opinion (PCT/ISA/237) dated Jan. 28, 2019 from the International Searching Authority in application No. PCT/KR2018/012311.

Yu, Y., et al., "Non-EE1: Priority List Based Intra Mode Coding with 5 MPM", Joint Video Exploration Team (JVET) of ITU-T SG 16 WP 3 and ISO/IEC JTC 1/SC 29/WG 11, Oct. 18-25, 2017, pp. 1-5.

Vadim Seregin et al., "Neighbor based intra most probable modes list derivation", Joint Video Exploration Team (JVET) of ITU-T SG 16 WP 3 and ISO/IEC JTC 1/SC 29/WG 11, Document: JVET-C0055, May 26, 2016, 3 pages total.

Communication dated Jul. 27, 2021 issued by the Korean Intellectual Property Office in counterpart Korean Application No. 10-2020-7006642 (with English Translation).

Communication dated Jul. 19, 2022 issued by the Indian Patent Office in application No. 202128045435.

Communication dated Jul. 18, 2022 issued by the Indian Patent Office in application No. 202128045409.

Communication dated Nov. 17, 2022 by the Israel Patent Office for Israeli Patent Application No. 273437.

* cited by examiner

FIG. 4
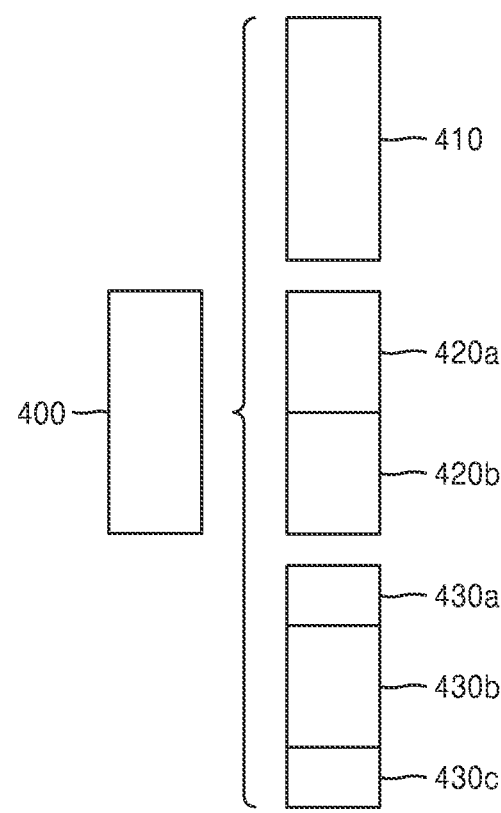
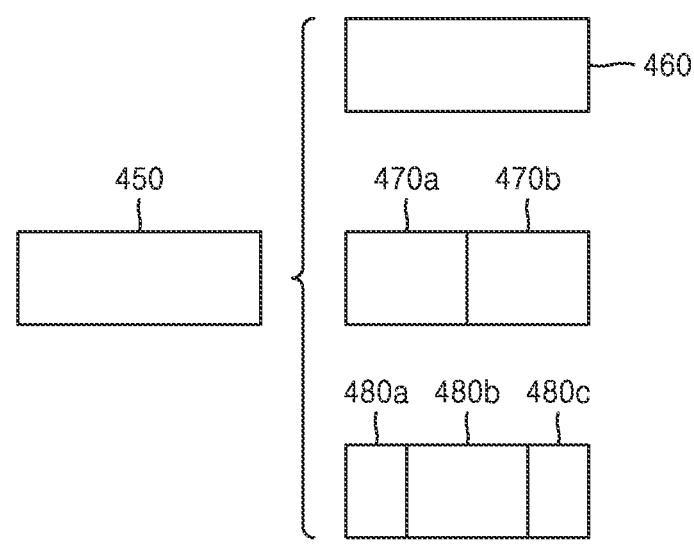

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

```
if(MPM flag)
{
    MPM flag(1) coding
    MPM coding
}
else
{
    MPM flag(0) coding
    if(PIMS flag)
    {
        PIMS flag(1) coding
        PIMS coding
    }
    else
    {
        PIMS flag(0) coding
        intra mode coding
    }
}
```

METHOD AND APPARATUS FOR VIDEO DECODING, AND METHOD AND APPARATUS FOR VIDEO ENCODING

CROSS REFERENCE TO RELATED APPLICATIONS

This application is a Continuation Application of U.S. application Ser. No. 16/651,126 filed Mar. 26, 2020, which is a National Stage of International Application No. PCT/KR2018/012311 filed Oct. 18, 2018, which claims priority to U.S. Provisional Application No. 62/573,915 filed Oct. 18, 2017, the entire contents of which are incorporated herein by reference.

TECHNICAL FIELD

The present disclosure relates to a video decoding method and a video decoding apparatus, and provides a method and apparatus for configuring an additional mode set based on most probable mode (MPM) modes of a current block, determining an intra prediction mode of the current block based on the MPM modes and the additional mode set, and thus performing intra prediction on the current block.

BACKGROUND ART

Image data is encoded by a preset codec conforming to a data compression standard, e.g., the Moving Picture Expert Group (MPEG) standard, and then is stored in a recording medium or transmitted through a communication channel in the form of a bitstream.

As hardware capable of reproducing and storing high-resolution or high-quality image content has been developed and become widely popular, a codec capable of efficiently encoding or decoding the high-resolution or high-quality image content is in high demand. The encoded image content may be reproduced by decoding it. Recently, methods of effectively compressing high-resolution or high-quality image content are used. For example, a method of randomly splitting an image to be encoded or a procedure of manipulating data is proposed to allow an image compression technique to be effectively implemented.

As one of data manipulation techniques, it is general, in intra prediction, to use at least two most probable mode (MPM) modes and to code data and perform signaling under the same conditions in other modes.

DESCRIPTION OF EMBODIMENTS

Technical Problem

Provided are a method and apparatus for configuring an additional mode set based on most probable mode (MPM) modes of a current block, determining an intra prediction mode based on the MPM modes and the configured additional mode set, and performing prediction on the current block according to the determined intra prediction mode.

Solution to Problem

To solve the technical problems, a video decoding method provided in the present disclosure includes configuring an additional mode set based on most probable mode (MPM) modes of a current block; determining an intra prediction mode of the current block, based on the MPM modes and the additional mode set; and performing intra prediction on the current block, based on the intra prediction mode.

To solve the technical problems, a video decoding apparatus provided in the present disclosure includes a memory; and at least one processor connected with the memory, wherein the at least one processor is configured to configure an additional mode set based on MPM modes of a current block, determine an intra prediction mode of the current block, based on the MPM modes and the additional mode set, and perform intra prediction on the current block, based on the intra prediction mode.

To solve the technical problems, a video encoding method provided in the present disclosure includes configuring an additional mode set based on MPM modes of a current block; determining an intra prediction mode of the current block, based on the MPM modes and the additional mode set; and performing intra prediction on the current block, based on the intra prediction mode.

To solve the technical problems, a video encoding apparatus provided in the present disclosure includes a memory; and at least one processor connected with the memory, wherein the at least one processor is configured to configure an additional mode set based on MPM modes of a current block, determine an intra prediction mode of the current block, based on the MPM modes and the additional mode set, and perform intra prediction on the current block, based on the intra prediction mode.

Advantageous Effects of Disclosure

In a video encoding and decoding procedure, an additional mode set may be configured based on most probable mode (MPM) modes of a current block, and then prediction may be performed on the current block by using an intra prediction mode determined based on the MPM modes and the additional mode set, such that performance may be enhanced due to accuracy in intra prediction, a bit amount occurring in the coding based on the intra prediction mode may be decreased, and thus, efficiency in mode signaling may be increased and reliability may be increased.

BRIEF DESCRIPTION OF DRAWINGS

FIG. 4 illustrates a process, performed by the image decoding apparatus, of determining at least one coding unit by splitting a non-square coding unit, according to an embodiment.

FIG. 13 illustrates a process of determining a depth of a coding unit as a shape and a size of the coding unit change, when the coding unit is recursively split such that a plurality of coding units are determined, according to an embodiment.

BEST MODE

Figure 1:
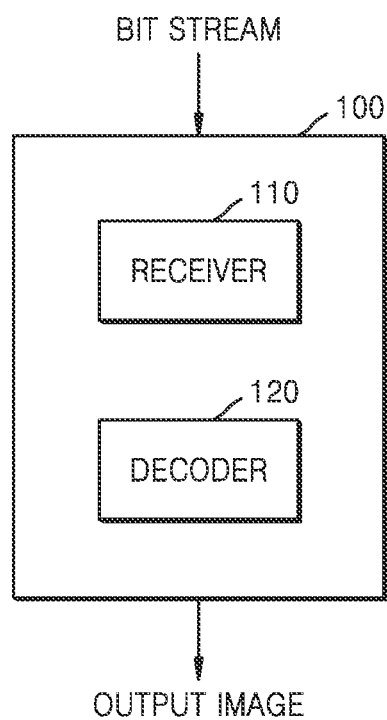
FIG. 1 is a schematic block diagram of an image decoding apparatus, according to an embodiment.

According to an embodiment of the present disclosure, a video decoding method includes configuring an additional mode set based on most probable mode (MPM) modes of a current block; determining an intra prediction mode of the current block, based on the MPM modes and the additional mode set; and performing intra prediction on the current block, based on the intra prediction mode.

According to an embodiment, the MPM modes of the current block may include a prediction mode of a neighboring block adjacent to a left side of the current block and a prediction mode of a neighboring block adjacent to a top side of the current block.

According to an embodiment, a neighboring block adjacent to a right side of the current block and a neighboring block adjacent to a top side of the current block may be reconstructed before the current block, and the MPM modes of the current block may include a prediction mode of the neighboring block adjacent to the right side of the current block and a prediction mode of the neighboring block adjacent to the top side of the current block.

According to an embodiment, the additional mode set may be determined based on types of the MPM modes.

According to an embodiment, the additional mode set may include at least one of a DC mode, a planar mode, a vertical mode, a horizontal mode, and a diagonal mode.

According to an embodiment, when the MPM modes are all angular modes, the additional mode set may include at least one of the DC mode, the planar mode, and intra prediction modes having index increased by n from index of each of the MPM modes, wherein n is a non-zero integer.

According to an embodiment, when the MPM modes are all angular modes, the additional mode set may include at least one of a DC mode, a planar mode, intra prediction modes having an index increased by 1 from index of each of the MPM modes, intra prediction modes having an index decreased by 1 from the index of each of the MPM modes, and intra prediction modes having an index decreased by 2 from the index of each of the MPM modes.

According to an embodiment, when an intra prediction mode of the neighboring block adjacent to the left side of the current block and an intra prediction mode of the neighboring block adjacent to the top side of the current block are equal and angular modes, the MPM modes and the additional mode set may include the intra prediction mode of the neighboring block adjacent to the left side, a DC mode, a planar mode, a mode of increasing, by 1, an index of the intra prediction mode of the neighboring block adjacent to the left side, an intra prediction mode having an index decreased by 1 from the index of the intra prediction mode of the neighboring block adjacent to the left side, and an intra prediction mode having an index decreased by 2 from the index of the intra prediction mode of the neighboring block adjacent to the left side.

According to an embodiment, when a first MPM mode of the MPM modes is a non-angular mode, and a second MPM mode of the MPM modes is an angular mode, the additional mode set may include at least one of a mode different from the first MPM mode from among a DC mode and a planar mode, an intra prediction mode having an index increased by n from an index of the second MPM mode, a vertical mode, and a horizontal mode, wherein n is a non-zero integer.

According to an embodiment of the present disclosure, a video encoding method includes configuring an additional mode set based on MPM modes of a current block; determining an intra prediction mode of the current block, based on the MPM modes and the additional mode set; and performing intra prediction on the current block, based on the intra prediction mode.

According to an embodiment of the present disclosure, a video decoding apparatus includes a memory; and at least one processor connected with the memory, wherein the at least one processor is configured to configure an additional mode set based on MPM modes of a current block, determine an intra prediction mode of the current block, based on the MPM modes and the additional mode set, and perform intra prediction on the current block, based on the intra prediction mode.

According to an embodiment of the present disclosure, a video encoding apparatus includes a memory; and at least one processor connected with the memory, wherein the at least one processor is configured to configure an additional mode set based on MPM modes of a current block, determine an intra prediction mode of the current block, based on the MPM modes and the additional mode set, and perform intra prediction on the current block, based on the intra prediction mode.

MODE OF DISCLOSURE

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples A unit including at least one such sample may be defined as a block.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus and an image decoding apparatus, and an image encoding method and an image decoding method according to embodiments will be described with reference to FIGS. 1 through 16. With reference to FIGS. 3 to 16, a method of determining a data unit of an image according to an embodiment will be described, and with reference to FIGS. 17 to 24, a method of configuring an additional mode set based on most probable mode (MPM) modes of a current block, determining an intra prediction mode of the current block based on the MPM modes and the additional mode set, and performing intra prediction on the current block, based on the determined intra prediction mode according to an embodiment will be described.

Hereinafter, the method and apparatus for adaptively selecting a context model, based on various shapes of coding unit according to an embodiment of the disclosure will now be described with reference to FIGS. 1 and 2.

FIG. 1 is a schematic block diagram of an image decoding apparatus 100, according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected via wire or wirelessly, and the receiver 110 may receive the bitstream via wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
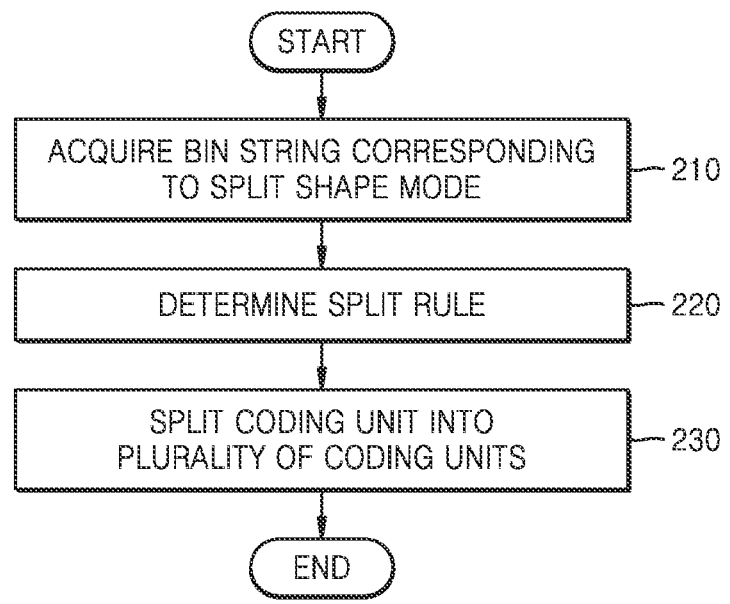
FIG. 2 is a flowchart of an image decoding method, according to an embodiment.

FIG. 2 is a flowchart of an image decoding method, according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the split rule and the bin string corresponding to the split shape mode (operation 230). The image decoding apparatus 100 may determine an allowable first range of a size of the coding unit, according to a ratio of the width to the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices. One slice may be a sequence of largest coding units (coding tree units (CTUs)). There is a largest coding block (coding tree block (CTB)) conceptually compared to a largest coding unit (CTU).

A largest coding block (CTB) refers to an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the lama sample and the chroma samples. When a picture is a monochrome picture, a largest coding unit includes a largest coding block of a monochrome sample and syntax structures used to encode the monochrome samples. When a picture is a picture having color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture having color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and information about a maximum size of a luma coding block that is bi-splittable may be obtained from a bitstream. The information about the luma block size difference may refer to a size difference between a luma largest coding unit and a largest luma coding block that is bi-splittable. Accordingly, when the information about the maximum size of the luma coding block that is bi-splittable and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half the size of the luma largest coding unit.

According to an embodiment, because the information about the maximum size of the luma coding block that is bi-splittable is obtained from the bitstream, the maximum size of the luma coding block that is bi-splittable may be variably determined. In contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER)

The image decoding apparatus 100 may obtain split shape mode information from a bitstream from one bin string. The bitstream received by the image decoding apparatus 100 may include a fixed length binary code, a unary code, a truncated unary code, a pre-determined binary code, etc. The bin string is a binary sequence of information. The bin string may include at least one bit. The image decoding apparatus 100 may obtain the split shape mode information corresponding to the bin string based on a split rule. The image decoding apparatus 100 may determine whether or not to quad split a coding unit, a split direction, and a split type, based on one bin string.

A coding unit may be equal to or smaller than a largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is to be performed, the largest coding unit may be split into coding units. Also, when split shape mode information about a coding unit indicates that splitting is to be performed, the coding unit may be split into smaller coding units. However, splitting of an image is not limited thereto, and a largest coding unit and a coding unit may not be distinguished from each other. Splitting of a coding unit will be described in more detail with reference to FIGS. 3 through 16.

Also, one or more prediction blocks for prediction may be determined from a coding unit. A prediction block may be equal to or smaller than a coding unit. Also, one or more transform blocks for transform may be determined from a coding unit. A transform block may be equal to or smaller than a coding unit.

Shapes and sizes of a transform block and a prediction block may not be related to each other.

In another embodiment, prediction may be performed by using a coding unit as a prediction unit. Also, transformation may be performed by using a coding unit as a transform block.

Splitting of a coding unit will be described in detail with reference to FIGS. 3 to 16. Each of a current block and a neighboring block of the present disclosure may indicate one of a largest coding unit, a coding unit, a prediction block, and a transform block. Also, a current block or a current coding unit is a block on which decoding or encoding is currently performed or a block on which splitting is currently performed. A neighboring block may be a block that is reconstructed before a current block. The neighboring block may be spatially or temporally adjacent to the current block. The neighboring block may be located at one of a lower-left side, a left side, an upper-left side, an upper side, an upper-right side, a right side, and a lower-right side of the current block.

Figure 3:
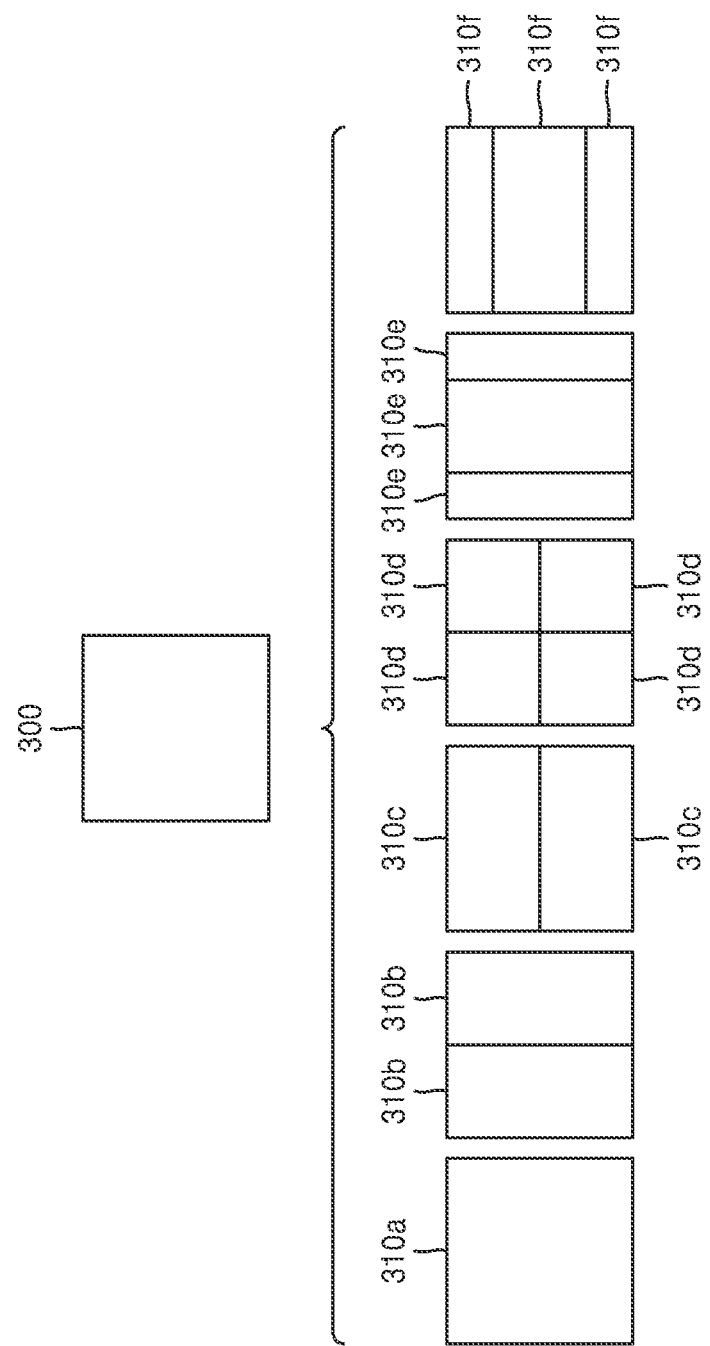
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N or N×8N. In this regard, N may be a positive integer. Block shape information is information indicating at least one of a shape, a direction, a ratio of a width to a height, or a size of a coding unit.

The shape of the coding unit may include a square shape and a non-square shape. When the width and the height of the coding unit are the same (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, N×4N, 32N×N, N×32N, 16N×N, N×16N, 8N×N or N×8N), the image decoding apparatus 100 may determine the block shape information of the coding unit as a non-square shape. When the shape of the coding unit is a non-square shape, the image decoding apparatus 100 may determine the ratio of the width to the height in the block shape information of the coding unit as at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on a length of the width and a length of the height of the coding unit. Also, the image decoding apparatus 100 may determine the size of the coding unit based on at least one of the length of the width, the length of the height, or an area, which is of the coding unit.

According to an embodiment, the image decoding apparatus 100 may determine a shape of the coding unit by using the block shape information, and may determine which shape the coding unit is split into by using split shape mode information. That is, a coding unit splitting method indicated by the split shape mode information may be determined according to which block shape is indicated by the block shape information used by the image decoding apparatus 100.

The image decoding apparatus 100 may determine the split shape mode information from a bitstream. However, the present disclosure is not limited thereto, and the image decoding apparatus 100 and the image encoding apparatus 200 may determine the split shape mode information that is predetermined based on the block shape information. The image decoding apparatus 100 may determine the split shape mode information that is predetermined for a largest coding unit or a smallest coding unit. For example, the image decoding apparatus 100 may determine that split shape mode information of a largest coding unit indicates quad-split. Also, the image decoding apparatus 100 may determine that split shape mode information of a smallest coding unit indicates "not to perform splitting". For example, the image decoding apparatus 100 may determine a size of the largest coding unit to be 256×256. The image decoding apparatus 100 may determine that the predetermined split shape mode information indicates quad-split. The quad-split is a split shape mode in which a width and a height of a coding unit are halved. The image decoding apparatus 100 may obtain a coding unit having a size of 128×128 from the largest coding unit having a size of 256×256, based on the split shape mode information. Also, the image decoding apparatus 100 may determine a size of the smallest coding unit to be 4×4. The image decoding apparatus 100 may obtain the split shape mode information indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not to be split, based on the split shape mode information indicating not to perform splitting, or may determine coding units 310b, 310c, 310d, 310e, and 310f split based on the split shape mode information indicating a preset splitting method.

Referring to FIG. 3, according to an embodiment, the image decoding apparatus 100 may determine two coding units 310b obtained by vertically splitting the current coding unit 300, based on the split shape mode information indicating to vertically perform splitting. The image decoding apparatus 100 may determine two coding units 310c obtained by horizontally splitting the current coding unit 300, based on the split shape mode information indicating to horizontally perform splitting. The image decoding apparatus 100 may determine four coding units 310d obtained by vertically and horizontally splitting the current coding unit 300, based on the split shape mode information indicating to vertically and horizontally perform splitting. The image decoding apparatus 100 may determine three coding units 310e obtained by vertically splitting the current coding unit 300, based on the split shape mode information indicating to vertically perform ternary splitting according to an embodiment. The image decoding apparatus 100 may determine three coding units 310f obtained by horizontally splitting the current coding unit 300, based on the split shape mode information indicating to horizontally perform ternary splitting. However, split shapes by which the square coding unit is splittable are not limited to the aforementioned split shapes, and the split shape mode information may include various shapes. Preset split shapes by which the square coding unit is split will now be described in detail through various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine, according to split shape mode information, whether not to split the non-square current coding unit or whether to split the non-square current coding unit by using a preset method. Referring to FIG. 4, when the block shape information of a current coding unit 400 or 450 indicates a non-square shape, the image decoding apparatus 100 may determine a coding unit 410 or 460 having the same size as the current coding unit 400 or 450 based on the split shape mode information indicating not to perform splitting, or determine coding units 420a and 420b, 430a to 430c, 470a and 470b, or 480a to 480c split based on the split shape mode information indicating a preset splitting method. Preset splitting methods of splitting a non-square coding unit will now be described in detail through various embodiments.

According to an embodiment, the image decoding apparatus 100 may determine, by using the split shape mode information, a split shape by which a coding unit is to be split, and in this case, the split shape mode information may indicate the number of one or more coding units to be generated by splitting the coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450 by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split the current coding unit 400 or 450, in consideration of the location of a long side of the non-square current coding unit 400 or 450. For example, the image decoding apparatus 100 may determine a plurality of coding units by splitting the long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of a width to a height of the current coding unit 400 or 450 may be 4:1 or 1:4. When the ratio of the width to the height is 4:1, a length of the width is greater than a length of the height, and thus the block shape information may indicate a horizontal direction. When the ratio of the width to the height is 1:4, a length of the width is smaller than a length of the height, and thus the block shape information may indicate a vertical direction. The image decoding apparatus 100 may determine to split the current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in a vertical direction, the image decoding apparatus 100 may horizontally split the current coding unit 400 and may determine the coding units 430a, 430b, and 430c. Also, when the current coding unit 450 is in a horizontal direction, the image decoding apparatus 100 may vertically split the current coding unit 450 and may determine the coding units 480a, 480b, and 480c.

According to an embodiment, the image decoding apparatus 100 may determine an odd number of coding units included in the current coding unit 400 or 450, and sizes of all of the determined coding units may not be the same. For example, a preset coding unit 430b or 480b from among the determined odd number of coding units 430a, 430b, and 430c, or 480a, 480b, and 480c may have a size different from sizes of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a preset restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a preset number of times, unlike the other coding units 430a and 430c, or 480a and 480c.

Figure 5:
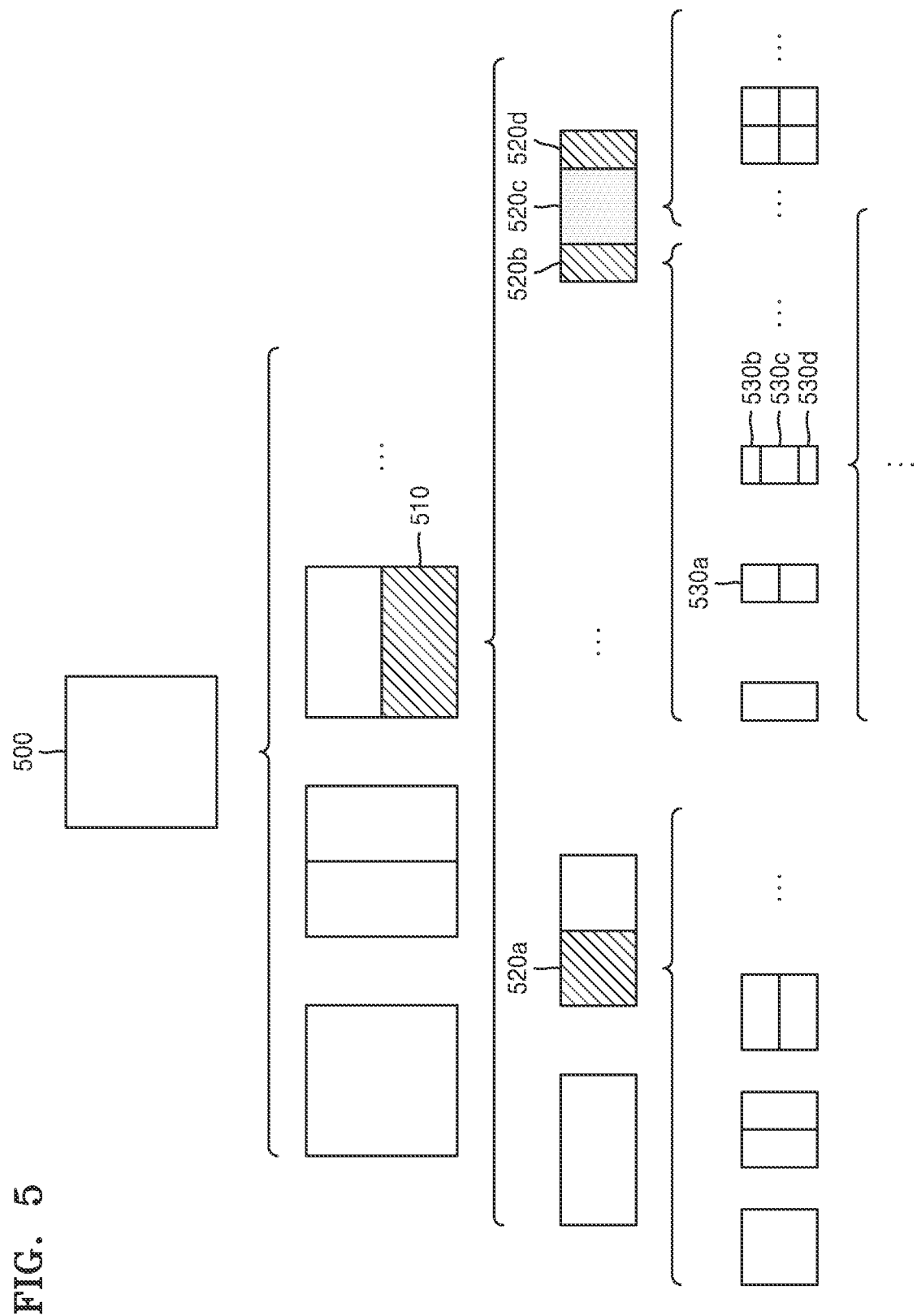
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after a coding unit is split. For example, the second coding unit may be determined by splitting the first coding unit, and the third coding unit may be determined by splitting the second coding unit. Hereinafter, it will be understood that a relationship among the first coding unit, the second coding unit, and the third coding unit applies to the following descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and may split a plurality of various-shaped second coding units (e.g., 510) by splitting the first coding unit 500, based on the obtained split shape mode information, and the second coding unit 510 may be split by using a splitting method of the first coding unit 500, based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d, based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location or a square coding unit) from among an odd number of third coding units 520b, 520c, and 520d determined by splitting the non-square second coding unit 510 may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split again into a plurality of coding units. For example, the non-square fourth coding unit 530b or 530d may be split again into an odd number of coding units. A method that may be used to recursively split a coding unit will be described below through various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510, based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the aforementioned examples, and it should be interpreted that the restrictions may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
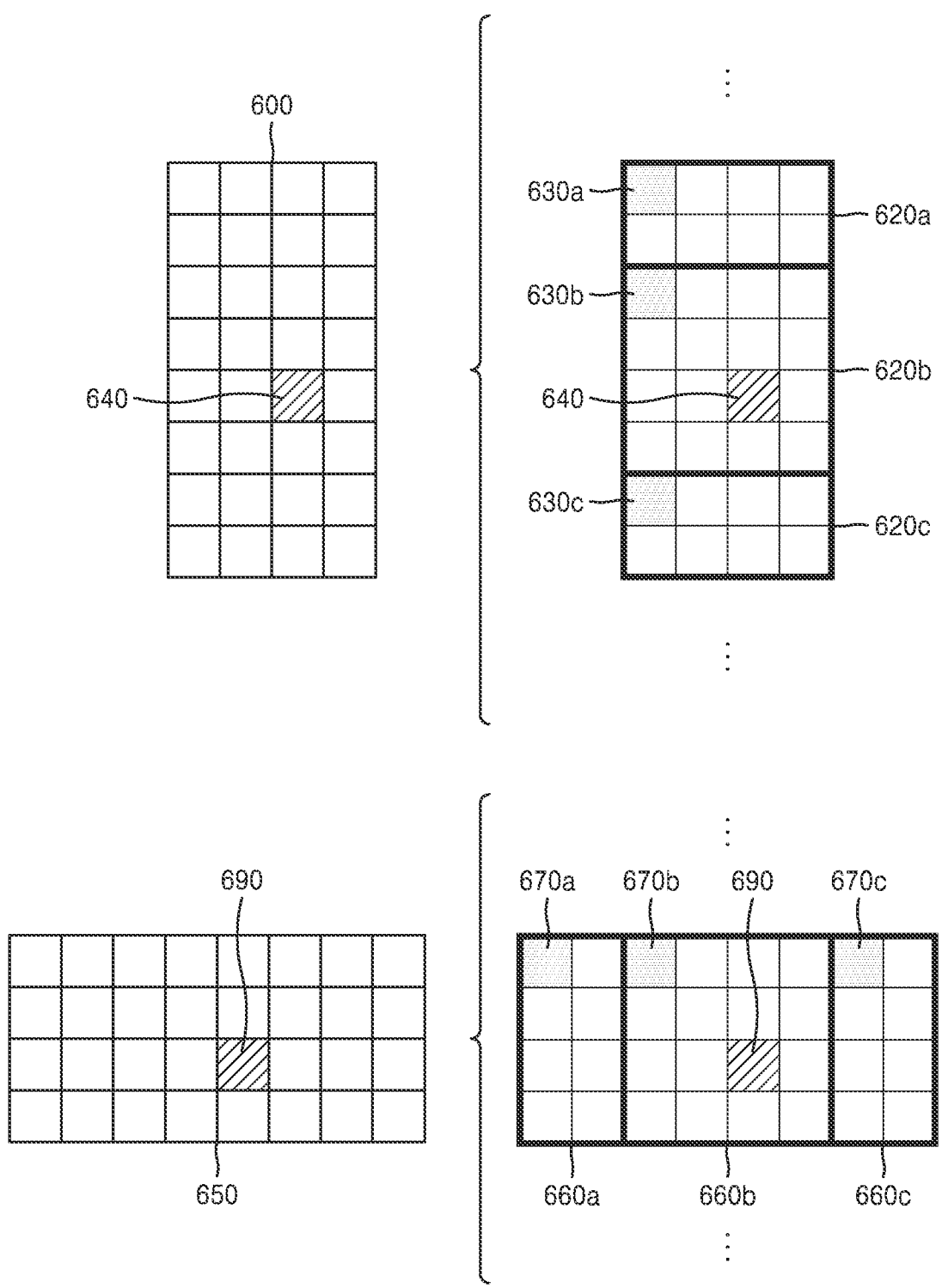
FIG. 6 illustrates a method, performed by the image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one of the split shape mode information may be obtained, is not limited to the center location in FIG. 6, and it should be interpreted that the preset location may include various locations (e.g., top, bottom, left, right, upper-left, lower-left, upper-right, lower-right locations, or the like) included in the current coding unit 600. The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods that may be used to select one of a plurality of coding units will be described below through various embodiments.

According to an embodiment, the image decoding apparatus 100 may split the current coding unit into a plurality of coding units, and may determine a coding unit at a preset location.

According to an embodiment, the image decoding apparatus 100 may use information indicating locations of an odd number of coding units so as to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center location or the coding unit 660b at a center location by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 530b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630b of the middle coding unit 620b and coordinates (dxc, dyc) indicating a relative location of the top-left sample 630c of the lower coding unit 620c, with reference to the location of the top-left sample 630a of the upper coding unit 620a. Also, a method of determining a coding unit at a preset location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c, based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top-left sample 630a of the upper coding unit 620a, the coordinates (xb, yb) indicating the location of the top-left sample 630b of the middle coding unit 620b, and the coordinates (xc, yc) indicating the location of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be a width of the current coding unit 600. The image decoding apparatus 100 may determine the height of the upper coding unit 620a to be yb-ya. According to an embodiment, the image decoding apparatus 100 may determine the width of the middle coding unit 620b to be a width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine a width or a height of each of the coding units 660a, 660b, and 660c by using coordinates (xd, yd) that are information indicating a location of a top-left sample 670a of the left coding unit 660a, coordinates (xe, ye) that are information indicating a location of a top-left sample 670b of the middle coding unit 660b, and coordinates (xf, yf) that are information indicating a location of a top-left sample 670c of the right coding unit 660c. The image decoding apparatus 100 may determine sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a as the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or the height of the right coding unit 660c by using the width or the height of the current coding unit 650 and the width and the height of the left coding unit 660a and the middle coding unit 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described top-left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape where a width of which is longer than a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape where a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above with reference to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various kinds of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620*b* including a sample, from which preset information (e.g., the split shape mode information) may be obtained, from among the plurality of coding units 620*a*, 620*b*, and 620*c* determined by splitting the current coding unit 600, and may put a preset restriction on the coding unit 620*b*. Referring to FIG. 6, according to an embodiment, the image decoding apparatus 100 may determine the sample 640 at the center location of the current coding unit 600 as the sample from which the preset information may be obtained, and may put a preset restriction on the coding unit 620*b* including the sample 640, in a decoding operation. However, the location of the sample from which the preset information may be obtained is not limited to the above-described location, and may include arbitrary locations of samples included in the coding unit 620*b* to be determined for a restriction.

According to an embodiment, the location of the sample from which the preset information is obtainable may be determined based on the shape of the current coding unit 600. According to an embodiment, the block shape information may indicate whether the current coding unit has a square or non-square shape, and the location of the sample from which the preset information is obtainable may be determined based on the shape. For example, the image decoding apparatus 100 may determine a sample located on a boundary for dividing at least one of a width and height of the current coding unit in half, as the sample from which the preset information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the preset information is obtainable.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above with reference to FIG. 5, and thus detailed descriptions thereof will not be provided here.

According to an embodiment, the image decoding apparatus 100 may determine one or more coding units by splitting the current coding unit, and may determine an order of decoding the one or more coding units based on a preset block (e.g., the current coding unit).

Figure 7:
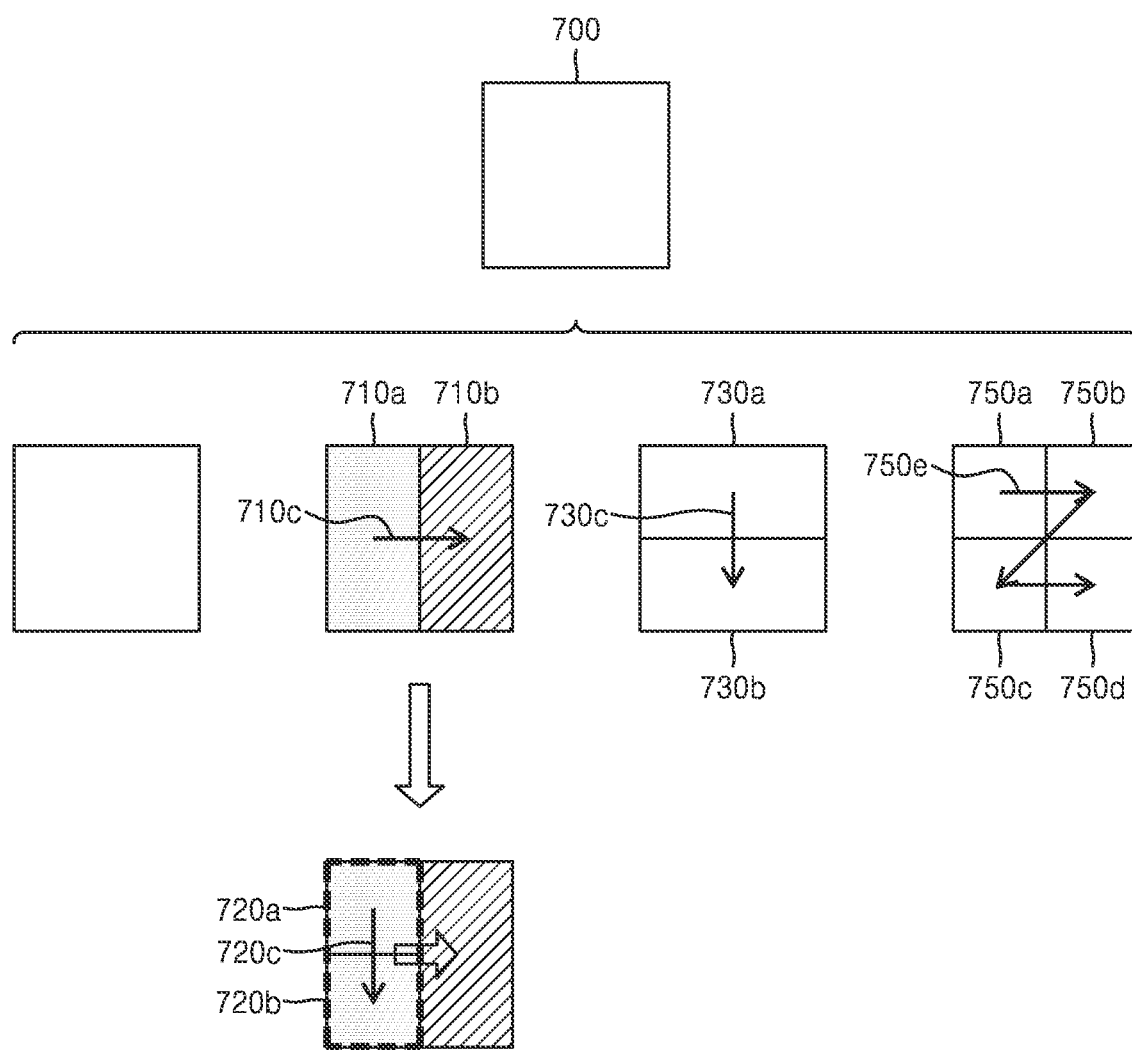
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c* and 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine to process the second coding units 750*a*, 750*b*, 750*c* and 750*d*, which are determined by splitting the first coding unit 700 in vertical and horizontal directions, according to a preset order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of second coding units 710*a*, 710*b*, 730*a*, 730*b*, 750*a*, 750*b*, 750*c*, and 750*d* by splitting the first coding unit 700, and may recursively split each of the determined plurality of second coding units 710*a*, 710*b*, 730*a*, 730*b*, 750*a*, 750*b*, 750*c*, and 750*d*. A splitting method of the plurality of second coding units 710*a*, 710*b*, 730*a*, 730*b*, 750*a*, 750*b*, 750*c*, and 750*d* may correspond to a splitting method of the first coding unit 700. As such, each of the plurality of second coding units 710*a*, 710*b*, 730*a*, 730*b*, 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
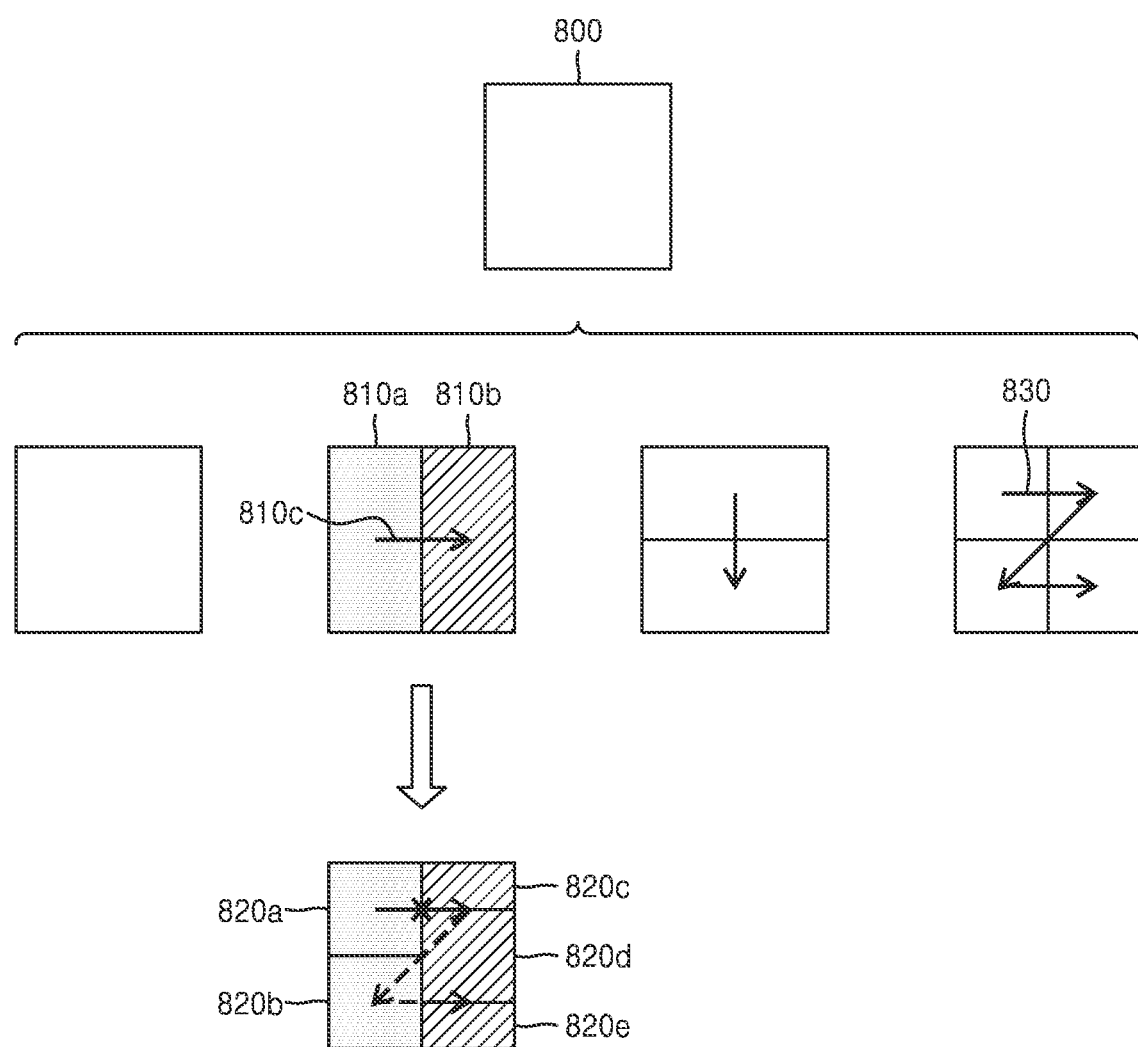
FIG. 8 illustrates a process, performed by the image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine whether the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is to be split into an odd number of coding units, by determining whether the third coding units 820a and 820b, and 820c to 820e are processable in a preset order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a, 820b, 820c, 820d and 820e is to be split into an odd number of coding units, based on at least one of block shape information and split shape mode information. For example, a second coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width and height of the second coding units 810a and 810b is to be divided in half along a boundary of the third coding units 820a and 820b, and 820c, 820d, and 820e. For example, the third coding units 820a and 820b determined by dividing the height of the non-square left second coding unit 810a in half may satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is to be split into an odd number of coding units, based on a result of the decision. According to an embodiment, when a coding unit is split into an odd number of coding units, the image decoding apparatus 100 may put a preset restriction on a coding unit at a preset location among the split coding units, and the restriction or the preset location has been described above through various embodiments and thus detailed descriptions thereof will not be provided here.

Figure 9:
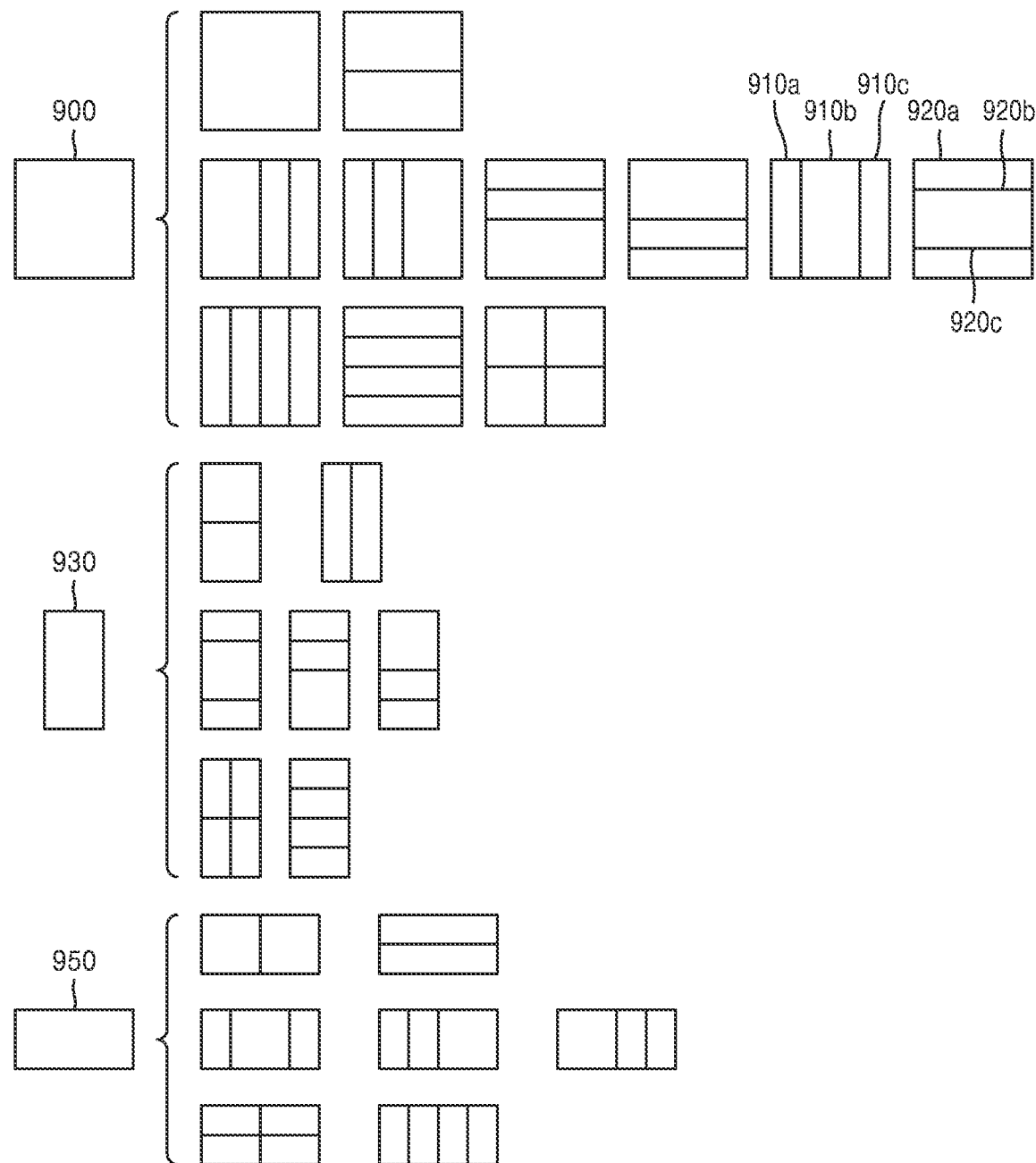
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained by the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the preset order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units, and the restriction or the preset location has been described above through various embodiments and thus detailed descriptions thereof will not be provided here.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
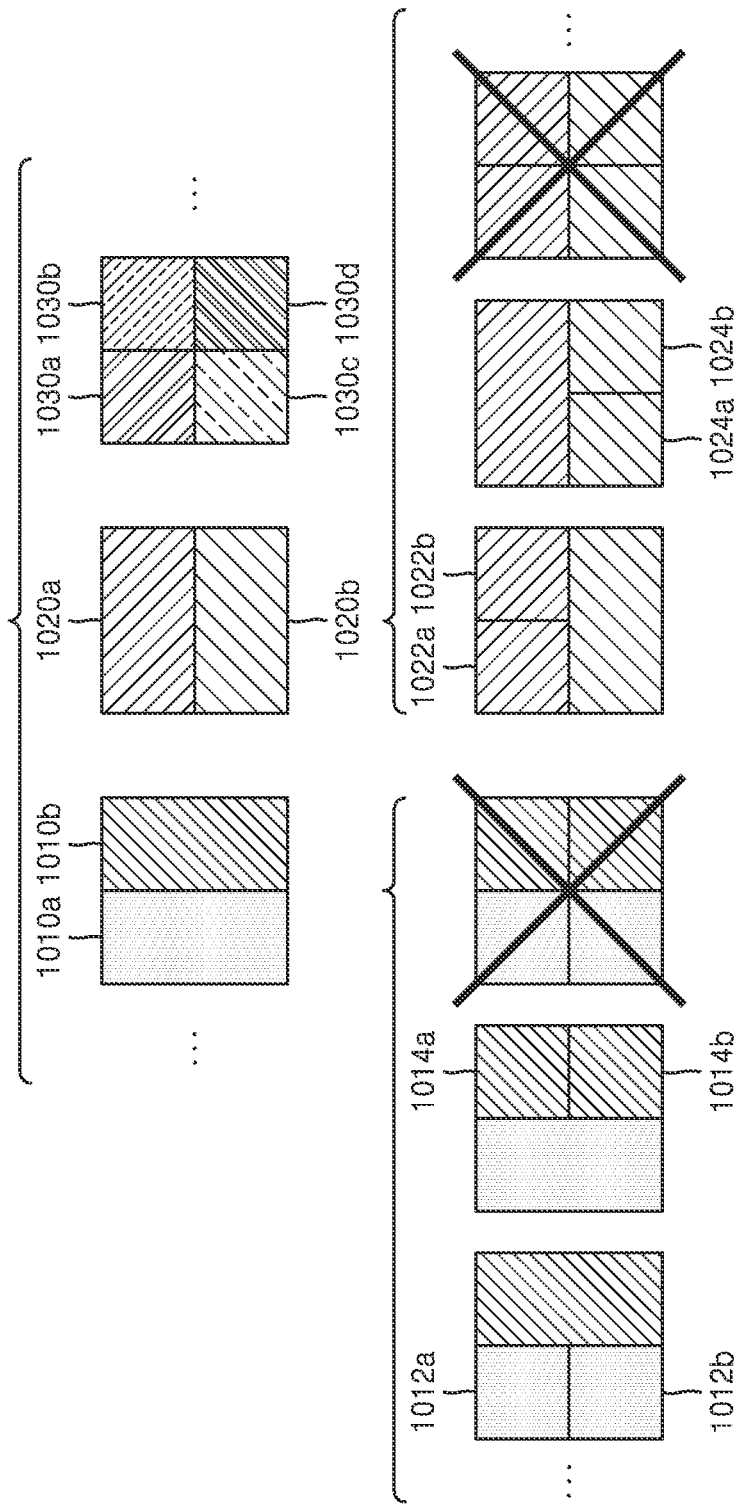
FIG. 10 illustrates that a shape into which a second coding unit is splittable by the image decoding apparatus is restricted when a second coding unit having a non-square shape, which is determined by splitting a first coding unit, satisfies a preset condition, according to an embodiment.

FIG. 10 illustrates that a shape into which a second coding unit is splittable by the image decoding apparatus 100 is restricted when a second coding unit having a non-square shape, which is determined by splitting a first coding unit 1000, satisfies a preset condition, according to an embodiment.

According to an embodiment, the image decoding apparatus 100 may determine to split the square first coding unit 1000 into non-square second coding units 1010a, 1010b, 1020a, and 1020b, based on split shape mode information, which is obtained by the receiver 110. The second coding units 1010a, 1010b, 1020a, and 1020b may be independently split. As such, the image decoding apparatus 100 may determine to split or not to split the first coding unit 1000 into a plurality of coding units, based on the split shape mode information of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
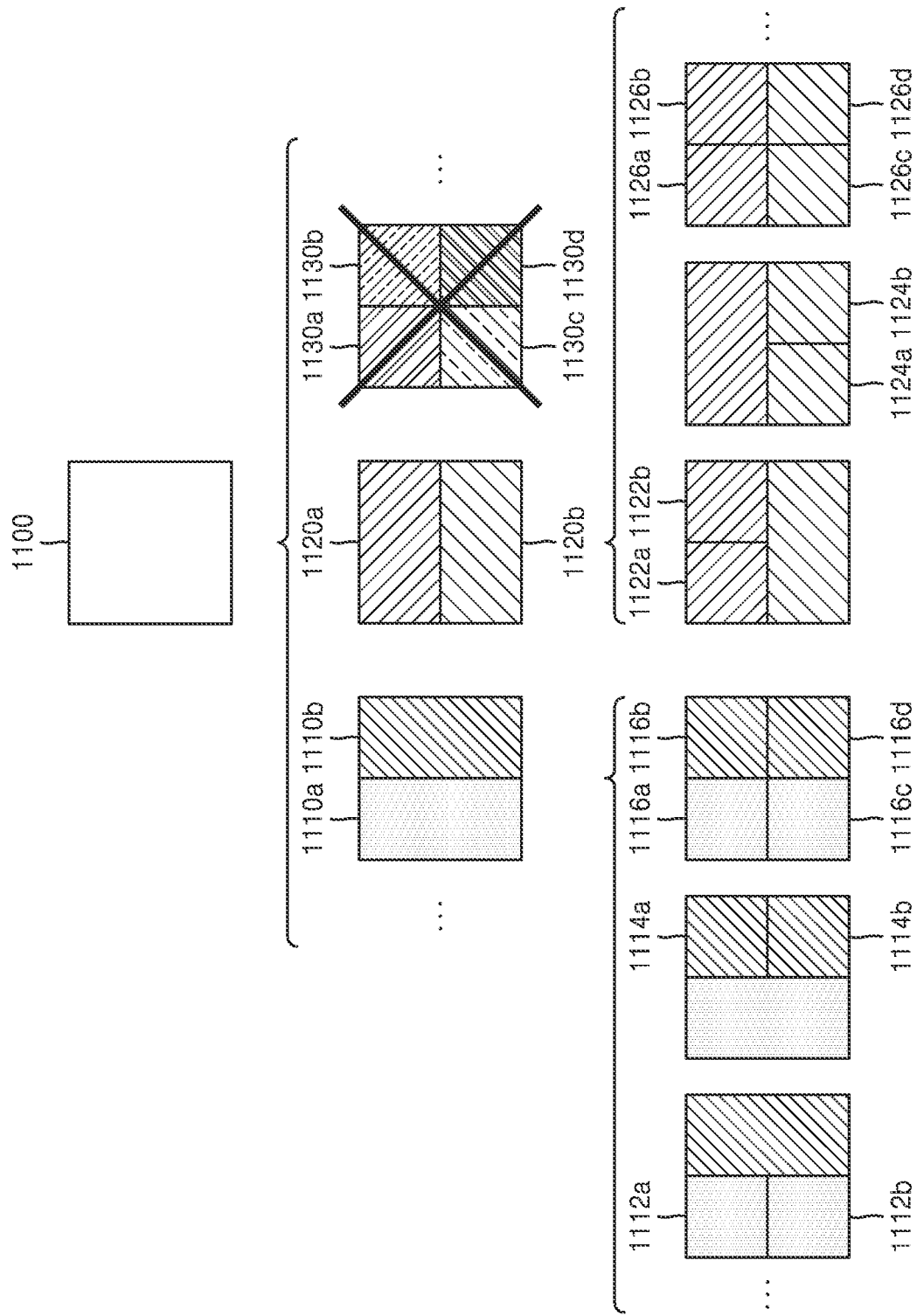
FIG. 11 illustrates a process, performed by the image decoding apparatus, of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100 based on split shape mode information. The split shape mode information may include information about various shapes by which a coding unit is splittable but, the information about various shapes may not include information for splitting a coding unit into four square coding units. According to such split shape mode information, the image decoding apparatus 100 cannot split the first square coding unit 1100 into four square second coding units 1130a, 1130b, 1130c, and 1130d. The image decoding apparatus 100 may determine the non-square second coding units 1110a, 1110b, 1120a, 1120b, etc., based on the split shape mode information.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
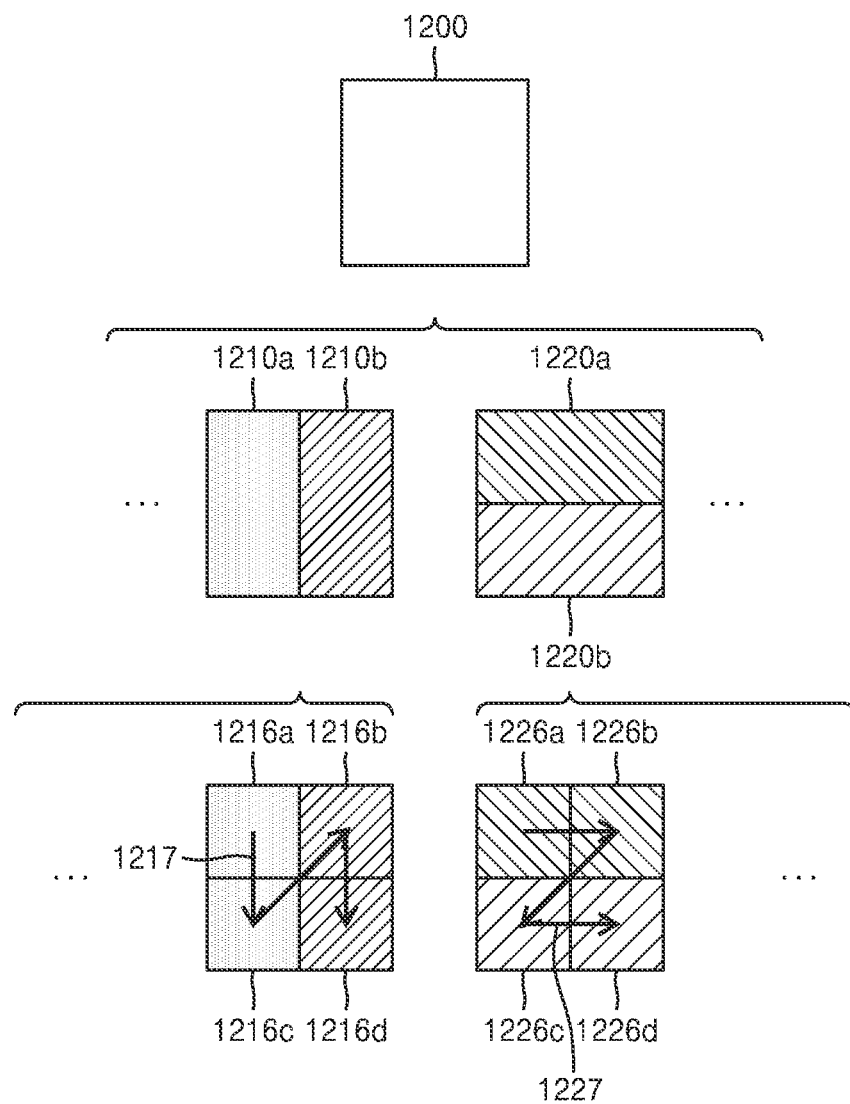
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of horizontal and vertical directions, the image decoding apparatus 100 may determine second coding units 1210a, 1210b, 1220a, 1220b, etc. by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the split shape mode information of each second coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210*a*, 1210*b*, 1220*a*, and 1220*b* has been described above with reference to FIG. 11, and thus detailed descriptions thereof will not be provided here.

According to an embodiment, the image decoding apparatus 100 may process coding units in a preset order. An operation of processing coding units in a preset order has been described above with reference to FIG. 7, and thus detailed descriptions thereof will not be provided here. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a*, 1210*b*, 1220*a*, and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302, a third coding unit 1304, etc. of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by dividing a width and height of the first coding unit 1300 in ½ may have a size of N×N. Furthermore, the third coding unit 1304 determined by dividing a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322, a third coding unit 1314 or 1324, etc. of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
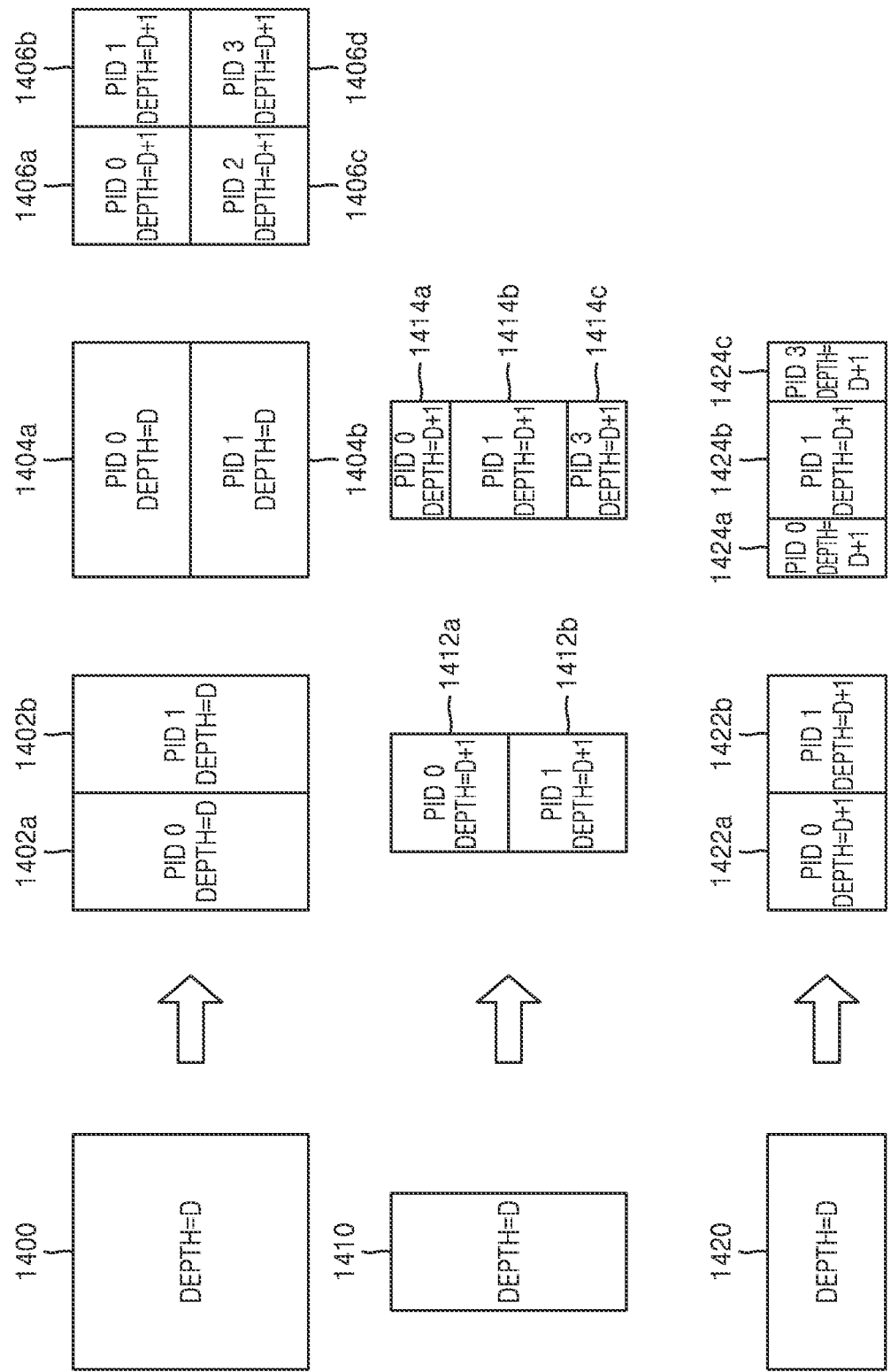
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, 1414a, 1414b, and 1414c, 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414b of a center location among the odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific split shape, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a preset location (e.g., an upper-left sample) of each coding unit.

According to an embodiment, the image decoding apparatus 100 may determine a coding unit of a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit of the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location (e.g., a coding unit of a center location) among an odd number of coding units has a size different from that of the other coding units. In this case, the image decoding apparatus 100 may determine the coding unit of the center location, which has a different size, by using PIDs of the coding units. However, the PID and the size or location of the coding unit of the preset location to be determined are not limited to the above-described examples, and various PIDs and various locations and sizes of coding units may be used.

According to an embodiment, the image decoding apparatus 100 may use a preset data unit where a coding unit starts to be recursively split.

Figure 15:
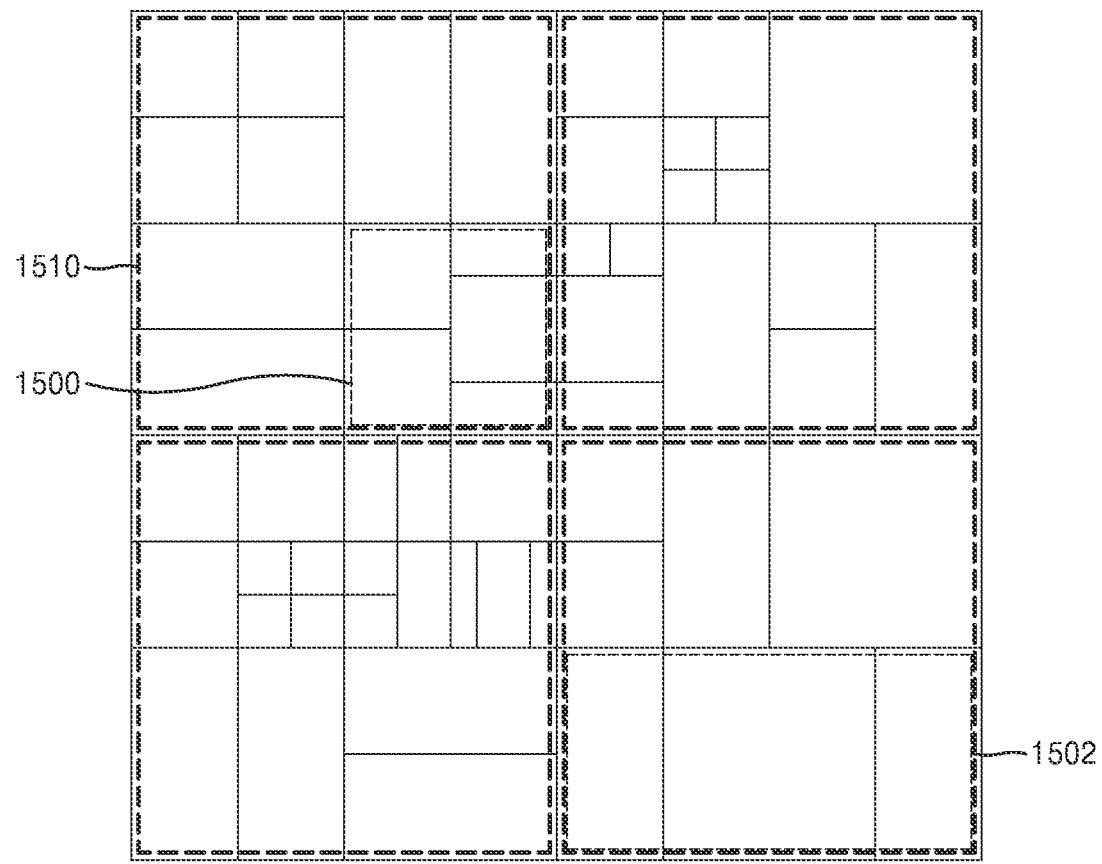
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using split shape mode information for each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the receiver 110 of the image decoding apparatus 100 may obtain, from a bitstream, at least one of reference coding unit shape information and reference coding unit size information with respect to each of the various data units. An operation of determining one or more coding units included in the square reference coding unit 1500 has been described above in relation to the operation of splitting the current coding unit 300 of FIG. 3, and an operation of determining one or more coding units included in the non-square reference coding unit 1502 has been described above in relation to the operation of splitting the current coding unit 400 or 450 of FIG. 4, and thus, detailed descriptions thereof will not be provided here.

According to an embodiment, the image decoding apparatus 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, slice segment, or largest coding unit which is a data unit satisfying a preset condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
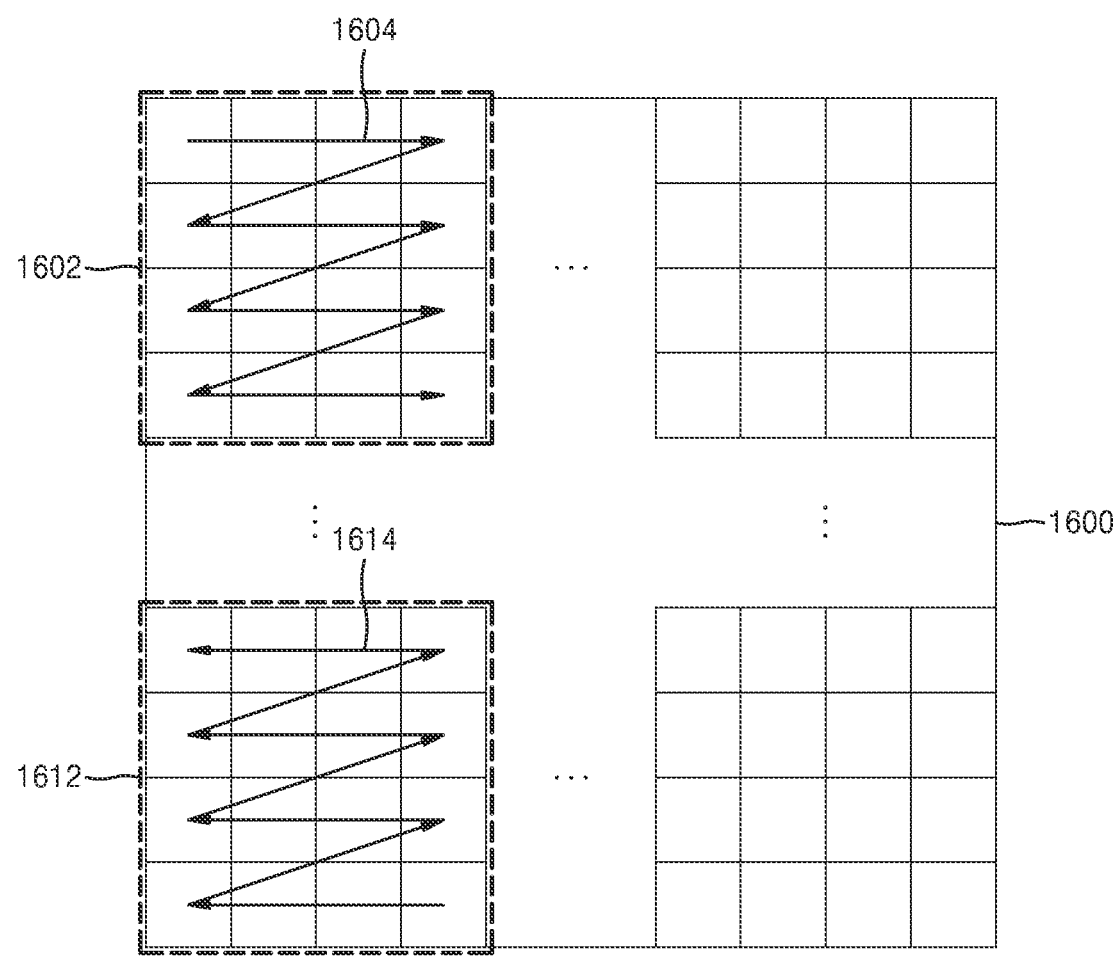
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a preset size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to the raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule according to an embodiment of the present disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream, The image decoding apparatus 100 may determine the split rule, based on information obtained from at least one of a sequence parameter set, a picture parameter set, a video parameter set, a slice header, and a slice segment header. The image decoding apparatus 100 may differently determine the split rule according to a frame, a slice, a temporal layer, a largest coding unit, or a coding unit.

The image decoding apparatus 100 may determine the split rule, based on a block shape of a coding unit. The block shape may include a size, a shape, a ratio of a width to a height, and a direction of the coding unit. The image encoding apparatus 200 and the image decoding apparatus 100 may previously determine to determine the split rule, based on the block shape of the coding unit. However, the present disclosure is not limited thereto. The image decoding apparatus 100 may determine the split rule, based on the information obtained from the bitstream received from the image encoding apparatus 200.

The shape of the coding unit may include a square shape and a non-square shape. When the width and the height of the coding unit are the same, the image decoding apparatus 100 may determine that the shape of the coding unit is a square shape. Also, when the width and the height of the coding unit are not the same, the image decoding apparatus 100 may determine that the shape of the coding unit is a non-square shape.

The size of the coding unit may include various sizes such as 4×4, 8×4, 4×8, 8×8, 16×4, 16×8, . . . , and 256×256. The size of the coding unit may be classified according to the length of a long side, the length of a short side, or the area of the coding unit. The image decoding apparatus 100 may apply the same split rule to coding units classified in the same group. For example, the image decoding apparatus 100 may classify coding units whose long sides have the same length as coding units having the same size. Also, the image decoding apparatus 100 may apply the same split rule to coding units whose long sides have the same length.

The ratio of the width to the height of the coding unit may include 1:2, 2:1, 1:4, 4:1, 1:8, 8:1, 1:16, 16:1, 32:1 or 1:32. Also, the direction of the coding unit may include a horizontal direction and a vertical direction. The horizontal direction may indicate a case where the length of the width of the coding unit is greater than the length of the height of the coding unit. The vertical direction may indicate a case where the length of the width of the coding unit is smaller than the length of the height of the coding unit.

The image decoding apparatus 100 may adaptively determine the split rule, based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 2200 and the image decoding apparatus 100. Also, the image decoding apparatus 100 may determine the split rule, based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different split paths do not have the same block shape. However, the present disclosure is not limited thereto, and the coding units generated via different split paths may have the same block shape. The coding units generated via different split paths may have different decoding processing orders. A decoding processing order has been described with reference to FIG. 12, and thus detailed descriptions thereof are not provided here.

Hereinafter, with reference to FIGS. 17 to 20, a method and apparatus for encoding or decoding a video by configuring an additional mode set based on MPM modes of a current block, determining an intra prediction mode of the current block based on the MPM modes and the additional mode set, and performing intra prediction on the current block, based on the determined intra prediction mode according to an embodiment disclosed in the present disclosure application will now be described.

Figure 17:
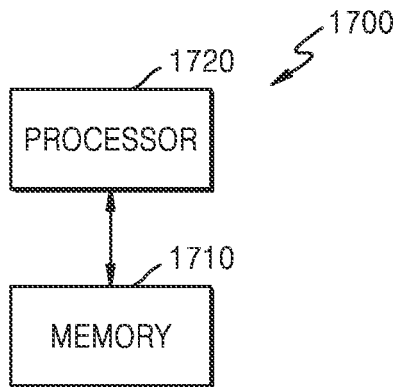
FIG. 17 illustrates a block diagram of a video decoding apparatus, according to an embodiment.

FIG. 17 illustrates a block diagram of a video decoding apparatus 1700, according to an embodiment.

The video decoding apparatus 1700 according to an embodiment may include a memory 1710 and at least one processor 1720 connected with the memory 1710. Operations of the video decoding apparatus 1700 according to an embodiment may be performed by separate processors or may be performed by the control of a central processor. Also, the memory 1710 of the video decoding apparatus 1700 may store data received from an external source, and data generated by a processor, e.g., information about the MPM modes of the current block and information about the configured additional mode set.

The processor 1720 of the video decoding apparatus 1700 may configure the additional mode set including at least one candidate mode, based on the MPM modes of the current block, may determine the intra prediction mode of the current block based on the MPM modes and the additional mode set, and may perform intra prediction, based on the intra prediction mode.

Hereinafter, with reference to FIG. 18, detailed operations of a video decoding method, performed by the video decoding apparatus 1700 according to an embodiment, of configuring an additional mode set based on MPM modes of a current block, determining an intra prediction mode of the current block based on the MPM modes and the additional mode set, and performing intra prediction will now be described.

Figure 18:
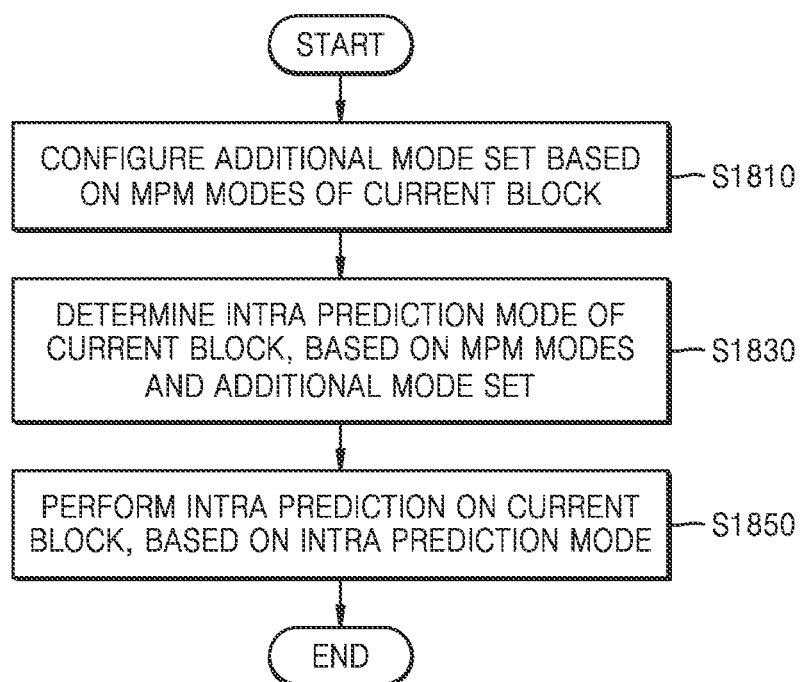
FIG. 18 illustrates a flowchart of a video decoding method, according to an embodiment.

FIG. 18 illustrates a flowchart of a video decoding method, according to an embodiment.

Referring to FIG. 18, in operation S1810, the video decoding apparatus 1700 may configure an additional mode set based on MPM modes of a current block.

According to an embodiment, the MPM modes of the current block may include a prediction mode of a neighboring block adjacent to the left side of the current block and a prediction mode of a neighboring block adjacent to the top side of the current block.

According to another embodiment, a neighboring block adjacent to the right side of the current block and a neighboring block adjacent to the top side of the current block may be reconstructed before the current block, and the MPM modes of the current block may include a prediction mode of the neighboring block adjacent to the right side of the current block and the prediction mode of the neighboring block adjacent to the top side of the current block. In a case where the neighboring block adjacent to the right side of the current block and the neighboring block adjacent to the top side of the current block exist, when the neighboring block adjacent to the left side of the current block simultaneously exists, an MPM mode may be configured by using information about the prediction mode of the left block and the prediction mode of the top block, and then an additional mode set may be configured by using information about the MPM mode and mode information of the right block. When mode information of the neighboring blocks adjacent in the left side, the top side, and the right side all exist, and some of the left block, the top block, and the right block are based on a same mode, a mode set may be configured by using only information about two different modes or may include more angular modes in directions close to index of duplicated mode from among modes of the neighboring blocks.

In operation S1830, the video decoding apparatus 1700 may determine an intra prediction mode of the current block, based on the MPM modes and the additional mode set.

According to an embodiment, as the intra prediction mode of the current block, an optimal intra prediction mode of the current block from among the MPM modes and modes of the additional mode set may be determined by using information obtained from a bitstream.

In operation S1850, the video decoding apparatus 1700 may perform intra prediction on the current block, based on the intra prediction mode.

According to an embodiment, the intra prediction mode of the current block is highly probable to have a relation to an intra prediction mode of a neighboring block, and thus, N intra prediction modes that are highly probable to become the intra prediction mode of the current block may constitute the additional mode set, by using mode information of the neighboring block or MPM information of the current block. The additional mode set may be configured of an intra prediction mode having an index that is increased by n from an intra prediction mode index of a left block mode, and an intra prediction mode having an index that is increased by m from an intra prediction mode index of a top block mode (where, n and m are non-zero integers). For example, when the left block and the top block are based on an angular mode, the additional mode set may be configured of an intra prediction mode having an index increased by 1 from the intra prediction mode index of the left block mode, an intra prediction mode having an index increased by 1 from the intra prediction mode index of the top block mode, an intra prediction mode having an index decreased by 1 from the intra prediction mode index of the left block mode, and an intra prediction mode having an index decreased by 1 from the intra prediction mode index of the top block mode. Alternatively, the additional mode set may be configured of the intra prediction mode having the index increased by 1 from the intra prediction mode index of the top block mode, an intra prediction mode having an index increased by 2 from the intra prediction mode index of the top block mode, an intra prediction mode having an index decreased by 2 from the intra prediction mode index of the left block mode, and an intra prediction mode having an index obtained by averaging intra prediction mode indices of the left block mode and the top block mode and then rounding off a result thereof.

Figure 21:
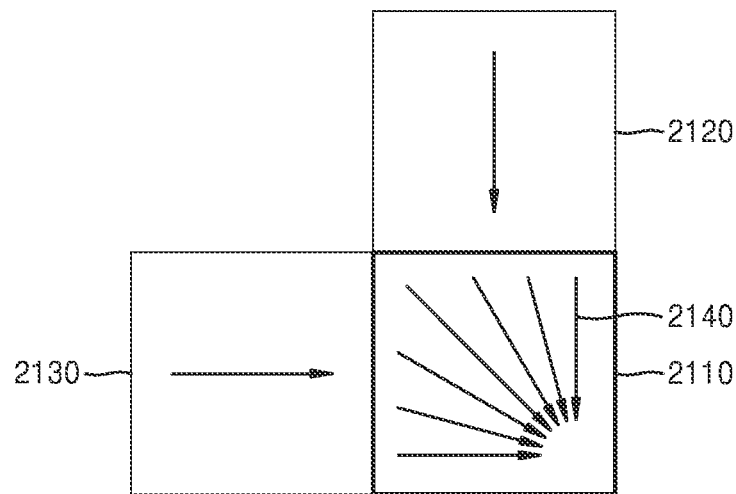
FIG. 21 illustrates an embodiment of modes of left and top neighboring blocks and a mode set of a current block.

FIG. 21 illustrates an embodiment of modes of left and top neighboring blocks and a mode set of the current block.

Referring to FIG. 21, when intra prediction modes of a top neighboring block 2120 adjacent to the top side of a current block 2110 and a left neighboring block 2130 adjacent to the left side of the current block 2110 are a vertical mode and a horizontal mode, respectively, an MPM mode of the current block 2110 may be determined as the vertical mode and the horizontal mode, and an additional mode set may include modes that have a high relation to the MPM mode and are close to the MPM mode, the modes being from among modes between the vertical mode and the horizontal mode.

For example, the additional mode set may be configured of an intra prediction mode having an index increased by 1 from an intra prediction mode index of the vertical mode, an intra prediction mode having an index increased by 2 from the intra prediction mode index of the vertical mode, an intra prediction mode having an index decreased by 2 from an intra prediction mode index of the horizontal mode, an intra prediction mode having an index decreased by 1 from the intra prediction mode index of the horizontal mode, and an intra prediction mode having an index obtained by averaging and then rounding off intra prediction mode indices of the vertical mode and the horizontal mode.

According to an embodiment, the additional mode set may include N modes (where, N is a predetermined integer) according to the number of intra prediction modes or the number of MPMs.

According to an embodiment, the additional mode set may differently include N or M (where, N and M are positive integers) modes, according to a type of an intra prediction mode of a neighboring block adjacent to a current block. In detail, the additional mode set may vary according to a case where an intra prediction mode of the neighboring block is an angular mode and a case where an intra prediction mode of the neighboring block is a non-angular mode such as a DC mode, a planar mode, or the like.

Figure 22:
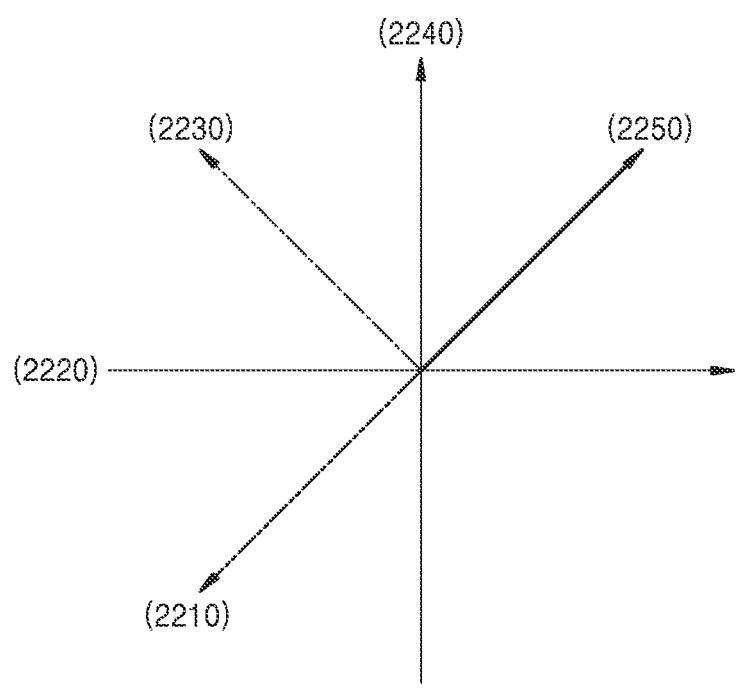
FIG. 22 illustrates an embodiment of intra prediction mode directions.

FIG. 22 illustrates an embodiment of intra prediction mode directions.

In detail, a vertical direction 2240 that is a y-axis positive direction and a horizontal direction 2220 that is an x-axis negative direction, from among intra prediction directions of an intra prediction mode of FIG. 22, indicate a vertical mode and a horizontal mode of the intra prediction mode, respectively. FIG. 22 also illustrates, from among the intra prediction directions, a diagonal angular mode 2250 in an upper right quadrant which is a last direction of the intra prediction directions, a diagonal angular mode 2210 in a lower left quadrant which is a start direction of an angular mode, and a diagonal mode 2230 that is perpendicular to a direction of the angular mode 2250 which is a 45-degree direction. The direction of the angular mode 2250 of the intra prediction mode of FIG. 22 may be a direction other than the 45-degree direction.

According to an embodiment, the intra prediction mode may include 67 modes. In detail, the intra prediction mode may include a DC mode, a planar mode, and 65 angular modes. The intra prediction mode may be distinguished therein by indicating indices of the intra prediction mode to be 0 to 66 (0 indicates the planar mode, 1 indicates the DC mode, and 2 to 66 indicate angular modes).

Referring to FIG. 22, a mode of the intra prediction mode, the mode having an index of 2, may be the angular mode 2210 in a direction opposite to the angular mode 2250 in the 45-degree direction, a mode of the intra prediction mode, the mode having an index of 34, may be the diagonal mode 2230 that is perpendicular to the direction of the angular mode 2250 which is the 45-degree direction, a mode of the intra prediction mode, the mode having an index of 66, may be the angular mode 2250 in the 45-degree direction, an index of the horizontal direction 2220 that is the x-axis negative direction may be 18, and an index of the vertical direction 2240 that is the y-axis positive direction may be 50.

According to an embodiment, when the number of MPM modes is 2 and the number of other intra prediction modes is 65, an additional mode set may include 4 or 8 modes according to types of modes selected to be the MPM modes.

Table 1 below illustrates an example of the additional mode set configured according to types of two MPM modes when MPM[0] and MPM[1] respectively indicate intra prediction modes designated as MPM modes.

TABLE 1

| When both MPMs are non-angular modes. | When both MPMs are angular modes. |
| --- | --- |
| DC or planar mode | Planar mode |
| Vertical mode | DC mode |
| Horizontal mode | MPM[0] − 2 |
| Diagonal mode | MPM[0] − 1 |
|  | MPM[0] + 1 |
|  | MPM[1] − 2 |
|  | MPM[1] − 1 |
|  | MPM[1] + 1 |

In detail, when two MPM modes are all non-angular modes, an additional mode set may include 4 modes that are DC or planar mode, a vertical mode, a horizontal mode, and a diagonal mode. Alternatively, the additional mode set may include at least one of the DC or planar mode, the vertical mode, the horizontal mode, and the diagonal mode.

In another embodiment, when two MPM modes are all non-angular modes, the additional mode set may include at least one of the DC or planar mode, the vertical mode, the horizontal mode, an intra prediction mode of an index increased by 4 from an intra prediction mode index of the horizontal mode, and, intra prediction mode of an index decreased by 4 from the intra prediction mode index of the horizontal mode.

When two MPM modes are all angular modes, the additional mode set may include 8 modes that are a planar mode, a DC mode, an intra prediction mode (MPM[0]−2) having an index decreased by 2 from an index of MPM[0] mode, an intra prediction mode (MPM[0]−1) having an index decreased by 1 from the index of MPM[0] mode, an intra prediction mode (MPM[0]+1) having an index increased by 1 from the index of MPM[0] mode, an intra prediction mode (MPM[1]−2) having an index decreased by 2 from an index of MPM[1] mode, an intra prediction mode (MPM[1]−1) having an index decreased by 1 from the index of MPM[1] mode, and an intra prediction mode (MPM[1]+1) having an index increased by 1 from the index of MPM[1] mode. Alternatively, the additional mode set may include at least one of the planar mode, the DC mode, the intra prediction mode (MPM[0]−2) having the index decreased by 2 from the index of MPM[0] mode, the intra prediction mode (MPM[0]−1) having the index decreased by 1 from the index of MPM[0] mode, the intra prediction mode (MPM[0]+1) having the index increased by 1 from the index of MPM[0] mode, the intra prediction mode (MPM[1]−2) having the index decreased by 2 from the index of MPM[1] mode, the intra prediction mode (MPM[1]−1) having the index decreased by 1 from the index of MPM[1] mode, and the intra prediction mode (MPM[1]+1) having the index increased by 1 from the index of MPM[1] mode.

Alternatively, when an intra prediction mode (a candidate of MPM[0]) of a neighboring block adjacent to the left side of a current block and an intra prediction mode (a candidate of MPM[1]) of a neighboring block adjacent to the top side of the current block are same angular mode, MPM[0] may be determined to be the intra prediction mode of the neighboring block adjacent to the left side of the current block, and the rest of MPM modes and an additional mode set may include 5 modes that are a planar mode, a DC mode, an intra prediction mode (MPM[0]−2) having an index decreased by 2 from an index of MPM[0] mode, an intra prediction mode (MPM[0]−1) having an index decreased by 1 from the index of MPM[0] mode, and an intra prediction mode (MPM[0]+ 1) having an index increased by 1 from the index of MPM[0] mode. Alternatively, MPM[0] may be determined to be the intra prediction mode of the neighboring block adjacent to the left side of the current block, and the rest of MPM modes and the additional mode set may include at least one of the planar mode, the DC mode, the intra prediction mode (MPM[0]−2) having the index decreased by 2 from the index of MPM[0] mode, the intra prediction mode (MPM[0]−1) having the index decreased by 1 from the index of MPM[0] mode, and the intra prediction mode (MPM[0]+1) having the index increased by 1 from the index of MPM[0] mode.

In another embodiment, when two MPM modes are all angular modes, the additional mode set may include at least one of the DC mode, the planar mode, an intra prediction mode having an index increased by 1 from an intra prediction mode index of an MPM mode which have greater intra prediction mode index from among the MPM modes and an intra prediction mode having an index decreased by 1 from the intra prediction mode index of the MPM mode which have greater intra prediction mode index from among the MPM modes, or an intra prediction mode having an index increased by 2 from the intra prediction mode index of the MPM mode which have greater intra prediction mode index from among the MPM modes and an intra prediction mode having an index decreased by 2 from the intra prediction mode index of the MPM mode which have greater intra prediction mode index from among the MPM modes.

In another embodiment, when two MPM modes are all angular modes, the additional mode set may include at least one of the DC mode, the planar mode, and intra prediction modes having index increased by n from index of each of the MPM modes, wherein n is a non-zero integer.

Table 2 below shows an example of an additional mode set configured when one of the MPM modes is a non-angular mode and the other one is an angular mode, i.e., when MPM[0] is a non-angular mode and MPM[1] is an angular mode.

TABLE 2

| Case where angular + non-angular modes (4 modes) | Case where angular + non-angular modes (8 modes) |
| --- | --- |
| DC or planar mode (Mode different from MPM[0]) | DC or planar mode (Mode different from MPM[0]) |
| MPM[1] − 2 | MPM[1] + 2 |
| MPM[1] + 2 | MPM[1] + 1 |
| Default mode | MPM[1] − 1 |
|  | MPM[1] − 2 |
|  | Default mode |
|  | Default mode |
|  | Default mode |

In detail, when one of two MPM modes is a non-angular mode and the other one is an angular mode, the additional mode set may include 4 modes that are a mode is different from MPM[0] that is a non-angular mode from among "DC or planar mode", an intra prediction mode having an index decreased by 2 from a mode index of MPM[1] that is an angular mode, an intra prediction mode having an index increased by 2 from the mode index of MPM[1], and a default mode. Alternatively, the additional mode set may include at least one of 4 modes that are the mode that is from among "DC or planar mode" and is different from MPM[0] that is a non-angular mode, the intra prediction mode having the index decreased by 2 from the mode index of MPM[1] that is an angular mode, the intra prediction mode having the index increased by 2 from the mode index of MPM[1], and the default mode.

Also, the additional mode set may include 8 modes that are 3 default modes, the mode that is from among "DC or planar mode" and is different from MPM[0] that is a non-angular mode, the intra prediction mode having the index decreased by 2 from the mode index of MPM[1] that is an angular mode, an intra prediction mode having an index decreased by 1 from the mode index of MPM[1], an intra prediction mode having an index increased by 1 from the mode index of MPM[1], and the intra prediction mode having the index increased by 2 from the mode index of MPM[1]. Alternatively, the additional mode set may include 3 default modes, the mode that is from among "DC or planar mode" and is different from MPM[0] that is a non-angular mode, a mode of decreasing, by 2, the mode index of MPM[1] that is an angular mode, a mode of decreasing, by 1, the mode index of MPM[1], a mode of increasing, by 1, the mode index of MPM[1], and a mode of increasing, by 2, the mode index of MPM[1].

According to an embodiment, the additional mode set may include at least one of the mode that is from among "DC or planar mode" and is different from MPM[0] that is a non-angular mode, the intra prediction mode having the index decreased by 2 from the mode index of MPM[1] that is an angular mode, the intra prediction mode having the index decreased by 1 from the mode index of MPM[1], and the intra prediction mode having the index increased by 1 from the mode index of MPM[1].

According to an embodiment, a first MPM mode from among the MPM modes may be a non-angular mode, a second MPM mode may be an angular mode, and the additional mode set may include at least one of a mode different from the first MPM mode from among the DC mode and the planar mode, an intra prediction mode having an index increased by n from an index of the second MPM mode, a vertical mode, and a horizontal mode, wherein n is a non-zero integer.

According to an embodiment, the default mode may be selected from a default mode candidate list pre-configured to prepare a case in which candidates to be included in the additional mode set are decreased, the case including a case where at least two candidate modes are overlapped or a case where at least one of a mode or an MPM mode of a neighboring block is a non-angular mode. In detail, the default mode candidate list may include intra prediction modes that are frequently selected in the statistics, and an order of candidates included in the list may be listed from a mode having a higher probability.

According to an embodiment, for the default mode, an additional mode set may be configured in a manner that modes that have been used up to a current block in a current frame are counted and then intra prediction modes that are frequently selected are adaptively selected. Alternatively, the default mode may be selected by using a history about an intra prediction mode selected for a previous intra block of the current block in the current frame, or may be selected by applying priority numbers to modes of blocks adjacent to the current block.

Figures 23, 24:
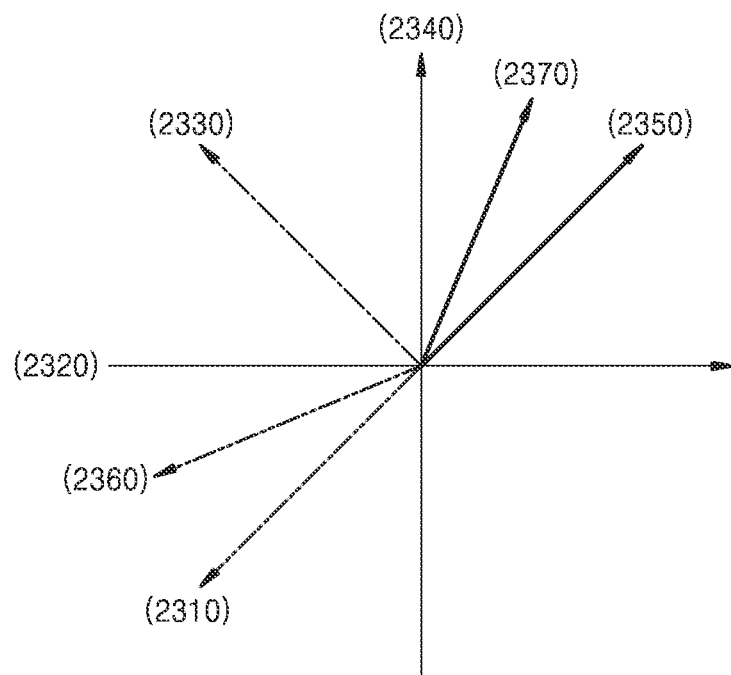
FIG. 23 illustrates an embodiment of an additional mode set.
FIG. 24 illustrates an embodiment of intra prediction mode signaling syntax.

FIG. 23 illustrates an embodiment of an additional mode set.

Referring to FIG. 23, the additional mode set may include a vertical direction 2340 that is a y-axis positive direction, a horizontal direction 2320 that is an x-axis negative direction, an angular mode 2350 in a 45-degree direction, an angular mode 2310 that is a direction opposite to the angular mode 2350 in a 45-degree direction, a diagonal mode 2330 that is perpendicular to a direction of the angular mode 2350 which is a 45-degree direction, an angular mode 2370 in a direction by which an angle between the vertical direction 2340 and the angular mode 2350 in a 45-degree direction is halved, and an angular mode 2360 in a direction by which an angle between the horizontal direction 2320 and the angular mode 2310 that is a direction opposite to the angular mode 2350 in a 45-degree direction is halved. In a case where an angle between two angular modes is halved, when there is no direction exactly corresponding thereto, an angular mode in the most adjacent direction may be used or an intra prediction mode having an index obtained by averaging respective intra prediction mode indices and then rounding off a result thereof may be used.

Figure 19:
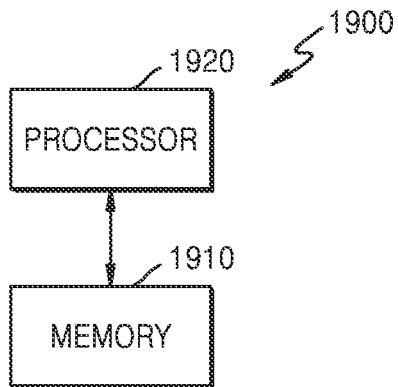
FIG. 19 illustrates a block diagram of a video encoding apparatus, according to an embodiment.
Figure 20:
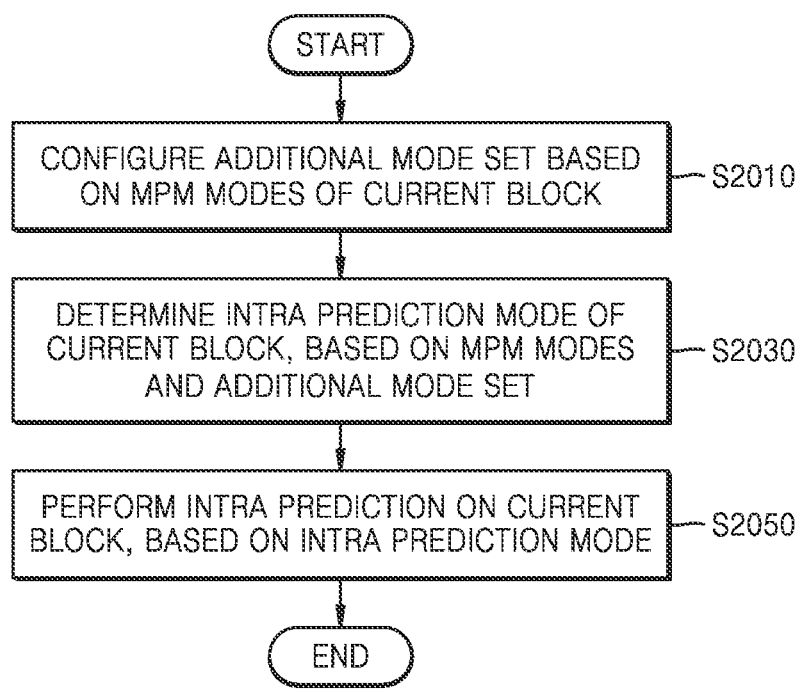
FIG. 20 illustrates a flowchart of a video encoding method, according to an embodiment.

FIGS. 19 and 20 illustrate a block diagram of a video encoding apparatus 1900 according to an embodiment and a flowchart of a video encoding method according to an embodiment that respectively correspond to a video decoding apparatus and a video decoding method described above.

The video encoding apparatus 1900 according to an embodiment may include a memory 1910 and at least one processor 1920 connected with the memory 1910. Operations of the video encoding apparatus 1900 according to an embodiment may be performed by separate processors or may be performed by the control of a central processor. Also, the memory 1910 of the video encoding apparatus 1900 may store data received from an external source, and data generated by a processor, e.g., information about the MPM modes of the current block and information about the configured additional mode set.

The processor 1920 of the video encoding apparatus 1900 may configure the additional mode set, based on the MPM modes of the current block, may determine the intra prediction mode of the current block based on the MPM modes and the additional mode set, and may perform intra prediction, based on the intra prediction mode.

Hereinafter, with reference to FIG. 20, detailed operations of the video encoding method, performed by the video encoding apparatus 1900 according to an embodiment, of configuring an additional mode set based on MPM modes of a current block, determining an intra prediction mode of the current block based on the MPM modes and the additional mode set, and performing intra prediction will now be described.

FIG. 20 illustrates a flowchart of a video encoding method, according to an embodiment.

Referring to FIG. 20, in operation S2010, the video encoding apparatus 1900 may configure an additional mode set based on MPM modes of a current block.

According to an embodiment, the MPM modes of the current block may be determined by using prediction modes of a neighboring block.

In operation S2030, the video encoding apparatus 1900 may determine an intra prediction mode of the current block, based on the MPM modes and the additional mode set.

According to an embodiment, the video encoding apparatus 1900 may encode intra prediction mode information by comparing the MPM modes and modes of the additional mode set with an optimal intra prediction mode determined in the current block. The optimal intra prediction mode of the current block may be determined by calculating rate-distortion cost of the current block.

In operation S2050, the video encoding apparatus 1900 may perform intra prediction on the current block, based on the intra prediction mode.

FIG. 24 illustrates an embodiment of intra prediction mode signaling syntax.

Referring to FIG. 24, when an MPM flag indicates 1, intra prediction is performed by using an MPM mode. When an MPM flag indicates 0, a flag of an additional mode set is checked and thus, when the flag of the additional mode set indicates 1, intra prediction is performed by using N modes of the additional mode set, and when the flag of the additional mode set indicates 0, intra prediction may be performed by using other remaining intra prediction mode. When the number of modes of the additional mode set is N, the flag of the additional mode set may be coded with allocated log 2(N) bits and then may be signaled.

According to an embodiment, a bit amount may be decreased by using unary coding or truncated unary coding according to the number of the modes of the additional mode set and probability that each mode is to be selected.

According to an embodiment, a same bit may be allocated to the additional mode set, and each bit may be efficiently coded using context modeling and then may be signaled.

According to an embodiment, when an intra prediction mode that is not a mode of the MPM mode and the additional mode set is selected, a bit is allocated except for the MPM mode and the modes of the additional mode set, such that the bit may be efficiently coded and then signaled.

According to an embodiment, a block unit flag may be used for the additional mode set, equally to the MPM flag.

According to an embodiment, whether to use only an MPM or also use an additional mode set may be determined based on an image.

According to an embodiment, a flag for determining whether to use an additional mode set may be transmitted in a unit of a frame.

According to an embodiment, whether to use an additional mode set and the number of modes of the additional mode set may be differently applied, according to sizes of blocks.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:
if a first flag indicates not to use any one among a plurality of intra prediction modes included in a most probable mode (MPM) list as an intra prediction mode of a current block, obtaining, from a bitstream, a second flag indicating whether to use one among a plurality of intra prediction modes included in an additional mode list or one among a plurality of remaining intra prediction modes as the intra prediction mode of the current block;

configuring the additional mode list using the plurality of intra prediction modes included in the MPM list;

if the second flag indicates to use the one among the plurality of intra prediction modes included in the additional mode list as the intra prediction mode of the current block, determining an intra prediction mode among the plurality of intra prediction modes included in the additional mode list to be the intra prediction mode of the current block; and performing intra prediction on the current block using the intra prediction mode of the current block, wherein when the plurality of intra prediction modes included in the MPM list are all angular modes, the additional mode list includes an intra prediction mode having an index decreased by 2 from an index of one among the plurality of intra prediction modes included in the MPM list, wherein when the first flag indicates not to use the any one among the plurality of intra prediction modes included in the MPM list as the intra prediction mode of the current block and the second flag indicates not to use any one among the plurality of intra prediction modes included in the additional mode list as the intra prediction mode of the current block, the one among the plurality of remaining intra prediction modes is determined to be the intra prediction mode of the current block, and wherein the current block is one among a plurality of blocks split from an upper block.

* * * * *